(12) United States Patent
Kawaguchi et al.

(10) Patent No.: US 8,294,813 B2
(45) Date of Patent: Oct. 23, 2012

(54) IMAGING DEVICE WITH A SCENE DISCRIMINATOR

(75) Inventors: Hirofumi Kawaguchi, Osaka (JP); Yasutoshi Yamamoto, Osaka (JP); Yuki Miura, Osaka (JP); Akihiro Okamoto, Osaka (JP); Shoichi Yokoi, Osaka (JP); Hidetsugu Ichino, Osaka (JP); Ikuhiro Sakurai, Osaka (JP); Masanori Kouyama, Osaka (JP)

(73) Assignee: Panasonic Corporation, Osaka (JP)

( * ) Notice: Subject to any disclaimer, the term of this patent is extended or adjusted under 35 U.S.C. 154(b) by 359 days.

(21) Appl. No.: 12/670,073

(22) PCT Filed: Apr. 11, 2008

(86) PCT No.: PCT/JP2008/000964
§ 371 (c)(1),
(2), (4) Date: Jan. 21, 2010

(87) PCT Pub. No.: WO2009/013850
PCT Pub. Date: Jan. 29, 2009

(65) Prior Publication Data
US 2010/0194931 A1    Aug. 5, 2010

(30) Foreign Application Priority Data

Jul. 23, 2007  (JP) ................................ 2007-191181

(51) Int. Cl.
*H04N 5/225* (2006.01)

(52) U.S. Cl. ...................................................... 348/371
(58) Field of Classification Search ................... 348/370, 348/371
See application file for complete search history.

(56) References Cited

U.S. PATENT DOCUMENTS

| | | | |
|---|---|---|---|
| 5,915,133 A | 6/1999 | Hirai et al. | |
| 6,757,488 B2 * | 6/2004 | Washisu | 348/208.4 |
| 7,433,586 B2 * | 10/2008 | Onozawa | 348/349 |
| 7,801,436 B2 * | 9/2010 | Kobayashi | 348/222.1 |
| 7,813,635 B2 * | 10/2010 | Tamura | 348/370 |
| 7,893,969 B2 * | 2/2011 | Sugimoto | 348/230.1 |
| 2002/0097441 A1 | 7/2002 | Hara et al. | |

(Continued)

FOREIGN PATENT DOCUMENTS

JP    7-222049 A    8/1995

(Continued)

OTHER PUBLICATIONS

Operating Instructions for Digital Camera DMC-FX9 manufactured by Matsushita Electric Industrial Co., Ltd. English translation.

*Primary Examiner* — Jason Whipkey
(74) *Attorney, Agent, or Firm* — Hamre, Schumann, Mueller & Larson, P.C.

(57) ABSTRACT

The imaging device of the present invention includes an image generator that generates an electric image from optical information inputted thereto; an operation portion that receives an instruction for a shooting preparation operation or a shooting operation from a user; a scene discriminator that discriminates a shooting scene on the basis of the image generated by the image generator and a picture quality adjuster that adjusts the picture quality of the image generated by the image generator on the basis of a result of discrimination performed by the scene discriminator. Due to this configuration, it is possible to discriminate an optimum shooting scene on the basis of an image to be captured, and consequently the operability can be improved.

20 Claims, 18 Drawing Sheets

U.S. PATENT DOCUMENTS

| | | |
|---|---|---|
| 2005/0018051 A1 | 1/2005 | Tomita et al. |
| 2006/0008264 A1 | 1/2006 | Yamaguchi et al. |
| 2006/0044422 A1* | 3/2006 | Miyazaki ................ 348/234 |
| 2007/0153111 A1* | 7/2007 | Kato .................. 348/333.11 |
| 2008/0037976 A1* | 2/2008 | Funaki et al. ............. 348/370 |
| 2008/0284900 A1* | 11/2008 | Abe ..................... 348/349 |

FOREIGN PATENT DOCUMENTS

| | | |
|---|---|---|
| JP | 9-281541 A | 10/1997 |
| JP | 2002-218480 A | 8/2002 |
| JP | 2003-274280 A | 9/2003 |
| JP | 2003-344891 A | 12/2003 |
| JP | 2004-88408 | 3/2004 |
| JP | 2005-043808 A | 2/2005 |
| JP | 2006-023383 A | 1/2006 |
| JP | 2006-023384 A | 1/2006 |
| JP | 2006-101186 A | 4/2006 |
| JP | 2006-195037 A | 7/2006 |
| JP | 3869487 B | 1/2007 |
| JP | 2007-184733 | 7/2007 |

* cited by examiner

IMAGING DEVICE WITH A SCENE DISCRIMINATOR

TECHNICAL FIELD

The present invention relates to imaging devices such as a digital camera.

BACKGROUND ART

With regard to digital cameras that have become widely available at a rapid pace, there have been an improvement in picture quality and an increase in the number of pixels in recent years. Along with these advancements, a variety of features that improve user operability have been proposed. A shooting scene selection feature is one of such features that improve the operability. This feature allows a user to select such shooting modes as a macro shooting mode, a night scenery shooting mode, a portrait shooting mode and a scenery shooting mode by operating a mode dial or cursor keys provided on the body of a digital still camera. By selecting a given shooting mode, the picture image suited for the shooting is automatically set. For example, when the macro shooting mode is selected, the firing of the flash is disabled and the edge enhancement correction gain is lowered from a usual level. Further, when the night scenery shooting mode is selected, the firing of the flash is enabled and a slow shutter speed is set.

In the method of selecting shooting scenes disclosed in Non-patent document 1, first, the mode dial is operated to shift the mode of the digital camera to a scene mode, and then, cursor keys are operated to select a desired shooting scene from a list of shooting scenes displayed on a monitor screen.
Non-patent document 1: Operating Instructions for Digital Camera DMC-FX9 manufactured by Matsushita Electric Industrial, Co., Ltd.

DISCLOSURE OF INVENTION

Problem to be Solved by the Invention

With the conventional configuration, however, it is necessary to operate the mode dial and the cursor keys to select a shooting scene. Thus, since a number of operations need to be performed to select a desired shooting scene, the operability therefore is compromised.

It is an object of the present invention to provide an imaging device capable of improving the operability by automatically determining the most desirable shooting scene on the basis of an image to be captured.

Means for Solving Problem

The imaging device of the present invention includes an image generator that generates an electric image from optical information inputted thereto; an operation portion that receives an instruction for a shooting preparation operation or a shooting operation from a user; and a scene discriminator that discriminates a shooting scene on the basis of the image generated by the image generator and/or information on a subject. The scene discriminator changes a way to discriminate a shooting scene before and after the operation portion is operated by the user.

Effect of the Invention

The present invention can improve the operability by automatically determining the most desirable shooting scene on the basis of an image to be captured.

Figure 1:
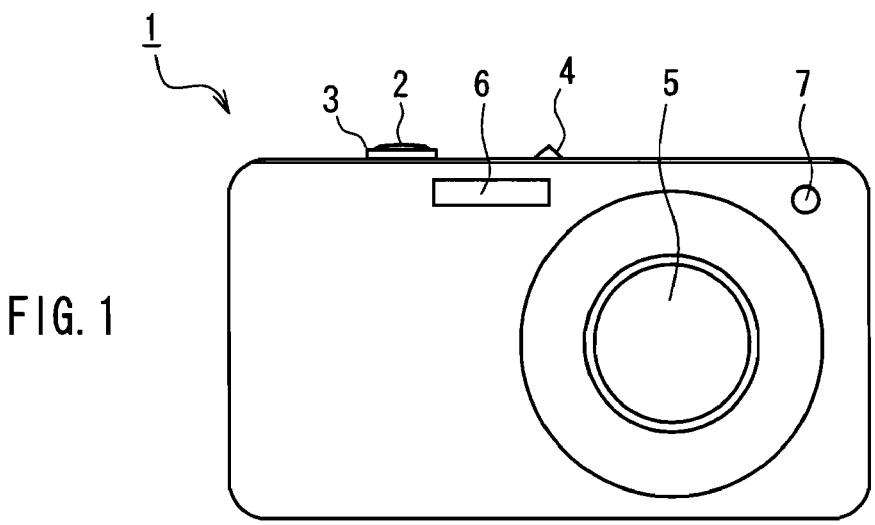
FIG. 1 is a side view showing a configuration of an imaging device according to one embodiment.

DESCRIPTION OF THE INVENTION (1) The imaging device of the present invention includes an image generator that generates an electric image from optical information inputted thereto; an operation portion that receives an instruction for a shooting preparation operation or a shooting operation from a user; and a scene discriminator that discriminates a shooting scene on the basis of the image generated by the image generator and/or information on a subject. The scene discriminator changes a way to discriminate a shooting scene before and after the operation portion is operated by the user.

The imaging device of the present invention, having the basic structure as described above, can be configured as follows.

(2) In the imaging device of the present invention, the image generator may include: an image pickup that converts an optical image entering thereinto to an electric image; a zoom controller that drives and controls a zoom lens for scaling up or down the optical image; a focus controller that drives and controls a focus lens capable of bringing the optical image into focus on an imaging surface of the image pickup; a diaphragm controller that controls an aperture of a diaphragm that adjusts an amount of light entering thereinto; and a shutter controller that controls a shutter speed, and the imaging device further may include a strobe light emitter that outputs strobe light.

(3) In the imaging device of the present invention, the image generator may include: an image pickup that converts an optical image entering thereinto to an electric image; a zoom controller that drives and controls a zoom lens for scaling up or down the optical image; a focus controller that drives and controls a focus lens capable of bringing the optical image into focus on an imaging surface of the image pickup; a diaphragm controller that controls an aperture of a diaphragm that adjusts an amount of light entering thereinto; and a shutter controller that controls a shutter speed, and the imaging device further may include a strobe light emitter that outputs strobe light and an auxiliary light emitter capable of outputting auxiliary light when the focus controller performs focus control.

(4) In the imaging device of the present invention, when a person is included in the image generated by the image generator, the scene discriminator may determine that the image is a portrait. According to such a configuration, as the device can discriminate a portrait, there is no need for a user to perform mode selection, and consequently, the operability can be improved.

(5) In the imaging device of the present invention, the scene discriminator may discriminate a scenery image on the basis of a distance to a subject on which the focus controller focuses and brightness information on the subject. According to such a configuration, as the device can discriminate a scenery image, there is no need for a user to perform mode selection, and consequently, the operability can be improved.

(6) In the imaging device of the present invention, the scene discriminator may discriminate a night scenery image on the basis of a distance to a subject on which the focus controller focuses, brightness information on the subject and an amount of auxiliary light that is outputted from the auxiliary light emitter and reflected by the subject. According to such a configuration, as the device can discriminate a night scenery image, there is no need for a user to perform mode selection, and consequently, the operability can be improved.

(7) In the imaging device of the present invention, the scene discriminator may discriminate a night scenery image on the basis of brightness information on a subject and an amount of auxiliary light that is outputted from the auxiliary light emitter and reflected by the subject. According to such a configuration, as the device can discriminate a night scenery image, there is no need for a user to perform mode selection, and consequently, the operability can be improved.

(8) In the imaging device of the present invention, the scene discriminator may discriminate a portrait including night scenery on the basis of information on whether or not a person is included in the image generated by the image generator, brightness information on a subject and an amount of light that is outputted from the strobe light emitter and reflected by the subject. According to such a configuration, as the device can discriminate a portrait including night scenery, there is no need for a user to perform mode selection, and consequently, the operability can be improved.

(9) In the imaging device of the present invention, when a distance to a subject on which the focus controller focuses is smaller than a predetermined distance, the scene discriminator may determine that the image generated by the image generator is a macro image. According to such a configuration, as the device can discriminate a macro image, there is no need for a user to perform mode selection, and consequently, the operability can be improved.

(10) The imaging device of the present invention further may include a vibration detector that detects vibrations of the imaging device. The scene discriminator may determine whether or not the imaging device is fixed on the basis of a result of detection performed by the vibration detector. According to such a configuration, whether or not the imaging device is fixed to a fixing means, such as a tripod, is discriminated, and on the basis of the discrimination result, the shutter speed, etc. are controlled to automatically perform the settings in accordance with the shooting conditions. As a result, the operability can be improved.

(11) The imaging device of the present invention further may include a display portion capable of displaying the image generated by the image generator or an image adjusted by a picture quality adjuster. The display portion may be capable of displaying information on a result of discrimination performed by the scene discriminator. According to such a configuration, results of the scene discrimination can be recognized visually.

(12) In the imaging device of the present invention, when the scene discriminator discriminates a shooting scene, the display portion may temporarily change a display form of the information on the discrimination result. According to such a configuration, it is possible to visually recognize that a result of the scene discrimination has changed.

(13) In the imaging device of the present invention, when a person is included in the image generated by the image generator and the strobe light emitter is enabled to flash at that time, the scene discriminator may determine that the image is a portrait including night scenery, and when a person is included in the image generated by the image generator and the strobe light emitter is disabled from flashing, the scene discriminator may determine that the image is a portrait. According to such a configuration, as the device can discriminate a portrait or a portrait including night scenery, there is no need for a user to perform mode selection, and consequently, the operability can be improved.

(14) In the imaging device of the present invention, after discriminating the portrait including night scenery, the scene discriminator may cause, when the operation portion receives the instruction for the shooting operation, the strobe light emitter to pre-flash before causing the strobe light emitter to carry out main flashing so as to calculate a brightness difference between a background of the image before the pre flash and the background of the image after the pre flash, when the brightness difference is a predetermined value or more, the scene discriminator may determine that the image is a portrait, and when the brightness difference is less than the predetermined value, the scene discriminator may determine that the image is a portrait including night scenery. According to such a configuration, as the device can discriminate a portrait or a portrait including night scenery, there is no need for a user to perform mode selection, and consequently, the operability can be improved.

(15) In the imaging device of the present invention, the scene discriminator may discriminate a scenery image on the basis of information that a person is not included in the image generated by the image generator, a distance to a subject on which the focus controller focuses and brightness information on the subject. According to such a configuration, as the device can discriminate a scenery image, there is no need for a user to perform mode selection, and consequently, the operability can be improved.

(16) In the imaging device of the present invention, the scene discriminator may discriminate a night scenery image on the basis of a distance to a subject on which the focus controller focuses, information that a person is not included in the image generated by the image generator, brightness information on the subject, and an amount of auxiliary light that is outputted from the auxiliary light emitter and reflected by the subject. According to such a configuration, as the device can discriminate a night scenery image, there is no need for a user to perform mode selection, and consequently, the operability can be improved.

(17) In the imaging device of the present invention, the scene discriminator may discriminate a night scenery image on the basis of information that a person is not included in the image generated by the image generator, brightness information on the subject and an amount of auxiliary light that is outputted from the auxiliary light emitter and reflected by the subject. According to such a configuration, as the device can discriminate a night scenery image, there is no need for a user to perform mode selection, and consequently, the operability can be improved.

(18) In the imaging device of the present invention, the scene discriminator may discriminate a macro image on the basis of information that a person is not included in the image generated by the image generator, information that a distance to a subject on which the focus controller focuses is smaller than a predetermined distance. According to such a configuration, as the device can discriminate a macro image, there is no need for a user to perform mode selection, and consequently, the operability can be improved.

(19) In the imaging device of the present invention, the scene discriminator discriminates a night scenery image on the basis of a distance to a subject on which the focus controller focuses, information that a person is not included in an image generated by the image generator, brightness information on the subject, an amount of auxiliary light that is outputted from the auxiliary light emitter and reflected by the subject and information that the strobe light emitter is disabled from flashing, and when the strobe light emitter is enabled to flash, the strobe light emitter is set to flash in a red-eye reduction/slow sync mode. According to such a configuration, at the time of shooting a portrait with night scenery as the background (a person or a person in night scenery was not determined), it is possible to shoot an image of a person together with night scenery as the background in high picture quality.

(20) In the imaging device of the present invention, the scene discriminator may discriminate a plurality of subject distances on the basis of information from the zoom controller and the focus controller, and thresholds for discriminating the subject distances may be variable in accordance with zoom magnification information from the zoom controller. According to such a configuration, regardless of zoom magnification, when the angle of view is constant the same subject distance (e.g., a macro distance which indicates the subject distance in the macro image) can be obtained and the same scene determination (e.g., determination of an macro image) can be achieved.

(21) The imaging device of the present invention includes an image generator that generates an electric image from optical information inputted thereto; an area selector capable of selecting a given area in the image generated by the image generator; and a scene discriminator that discriminates a shooting scene on the basis of the image in an area selected by the area selector and/or information on a subject.

(22) In the imaging device of the present invention, the area selector may be composed of a touch panel capable of detecting a position of a portion on an operation surface where a contact object comes into contact. By configuring the imaging device in this way, a user can select a given portion of an area that is displayed on the display portion. Thus, the user easily and promptly can select an image, etc. on which the user wishes to perform the scene discrimination.

(23) In the imaging device of the present invention, the scene discriminator may cause an area selected by the area selector to track a movement of the image, and discriminate a shooting scene on the basis of the image included in the tracked area and/or information on a subject.

Embodiment 1

1. Configuration and Basic Operation of the Imaging Device

Figure 2:
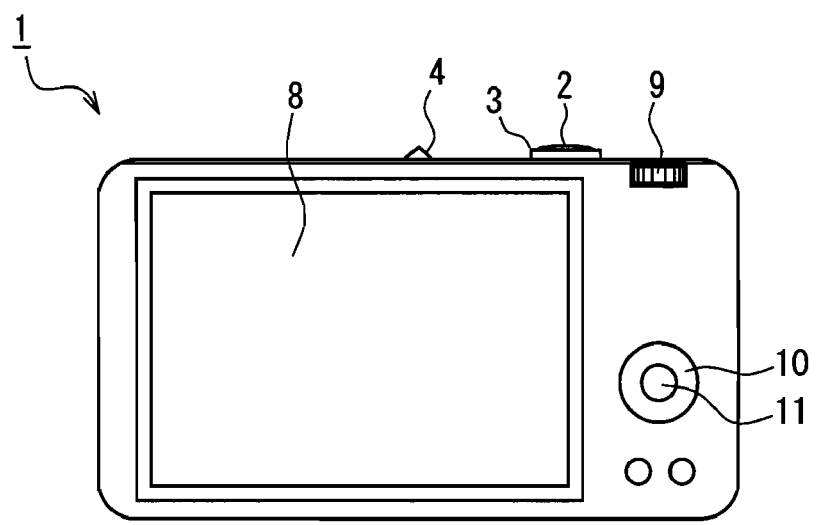
FIG. 2 is a rear view showing the configuration of the imaging device according to one embodiment.
Figure 3:
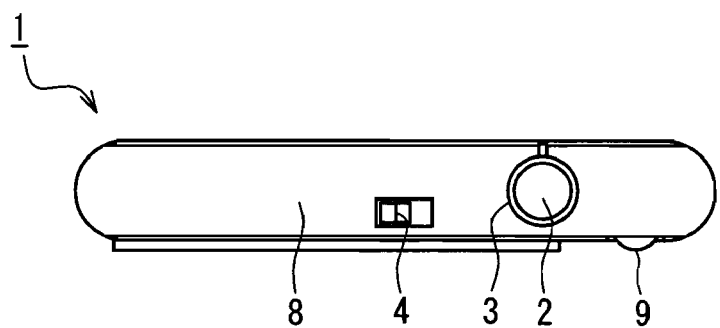
FIG. 3 is a plan view showing the configuration of the imaging device according to one embodiment.

FIG. 1 is a plan view showing a digital camera as an example of an imaging device according to the present embodiment. FIG. 2 is a side view of the imaging device, showing a surface of the imaging device provided with a display (hereinafter referred to as a back surface). FIG. 3 is a plan view of the imaging device, showing a surface of the imaging device on which a release button, etc. are provided (hereinafter referred to as a top surface).

As shown in FIGS. 1 to 3, the imaging device 1 includes a release button 2, a zoom switch 3, a power switch 4, an imaging portion 5, a strobe 6, an auxiliary light emitting portion 7, the display 8 and a mode dial 9. The imaging portion 5, the strobe 6 and the auxiliary light emitting portion 7 are provided on the front surface (the surface that faces the subject at the time of shooting) of the imaging device 1. Further, the release button 2, the zoom switch 3 and the power switch 4 are provided on the top surface. Furthermore, the display 8 and the mode dial 9 are provided on the back surface. Note that the arrangement and shape of each portion in FIGS. 1 to 3 are shown only by way of example.

By being pressed by a photographer, the release button 2 enables capture of an electric signal picked up by an imaging element as an image signal. The following operations can be performed on the release button 2: halfway-pressing operation in which when the release button 2 is operated about a half of the entire stroke, the internal switch is pressed; and full pressing operation in which when the release button 2 is operated the entire stroke, the internal switch is pressed. For example, AF operation is performed when the release button 2 is pressed halfway and shooting operation is performed when the release button 2 is pressed fully.

The zoom switch 3 is provided along the periphery of the release button 2 rotatably in the circumference direction of the release button 2. By rotating the zoom switch 3 by a predetermined rotation angle, it is possible to move, in the optical axis direction, a zoom lens provided in the imaging portion 5 to scale up or down an optical image formed in the imaging element. Note that the zoom operation is not limited to optical zoom achieved by moving the zoom lens, and it also includes electronic zoom achieved by scaling up or down an image signal by signal processing.

The power switch 4 is composed of a slide switch. The power can be turned on by sliding the power switch 4 in one direction and the power can be turned off by sliding the power switch 4 in the other direction.

The imaging portion 5 includes, for example, a lens unit composed of a focus lens, the zoom lens, etc. and the imaging element that captures an optical image entering thereinto through the lens unit and outputs an electric signal (image signal).

The strobe 6 can flash concurrently with the operation of the release button 2. By freely changing a setting within the imaging device 1, the mode of the strobe 6 can be switched between a flash enabled mode and a flash disabled mode. Note that the imaging device 1 in the present embodiment includes an automatic flash mode (AUTO mode), in which the ambient brightness of the imaging device 1 is detected to switch automatically between the flash enabled mode and the flash disabled mode, and a forced flash disabled mode (forced OFF mode) in which the firing of the flash is disabled forcibly.

The auxiliary light emitting portion 7 emits autofocus (hereinafter referred to as AF) auxiliary light when a sufficient amount of light needed to perform AF cannot be secured and detects the light reflected by the subject so as to perform AF operation. For example, the auxiliary light emitting portion 7 is composed of a light-emitting diode that emits red light.

The display 8 can display an image to be captured (a so-called through image), a menu screen and a variety of information such as shooting scene information and battery remaining information. Although the display 8 is composed of a liquid crystal panel in the present embodiment, it may be composed of an organic EL element or other display element.

The mode dial 9 is provided rotatably, and it enables setting the mode of the imaging device 1. Settable modes include, for example, a normal shooting mode in which still images can be taken, a high-speed shooting mode suited for shooting the subject with a quick movement, a macro shooting mode suited for shooting the subject from a close-up range, and a playback mode in which images recorded in an information medium can be displayed on the display 8. In the present embodiment, an automatic scene selection mode can also be selected in addition to the above-mentioned modes. A means for selecting the automatic scene selection mode is not limited to the mode dial 9 and the automatic scene selection mode may be selected by operating a specific button or a menu. The operation, etc. of the automatic scene selection mode will be described later.

The cursor keys 10 can be operated in the vertical and horizontal directions, and up, down, left and right operating portions are each assigned to a predetermined function. For example, the assigned functions include switching the mode of the strobe 6 to the flash disabled mode or the flash enabled mode, switching a self-timer feature to ON or OFF and setting bracket shooting. Further, when a menu screen is displayed on the display 8, the cursor keys 10 may be operated to move a cursor displayed in the menu in a desired direction.

The button 11 is placed at the center of the cursor keys 10 and it is operated mainly to perform the "enter" operation.

Figure 4:
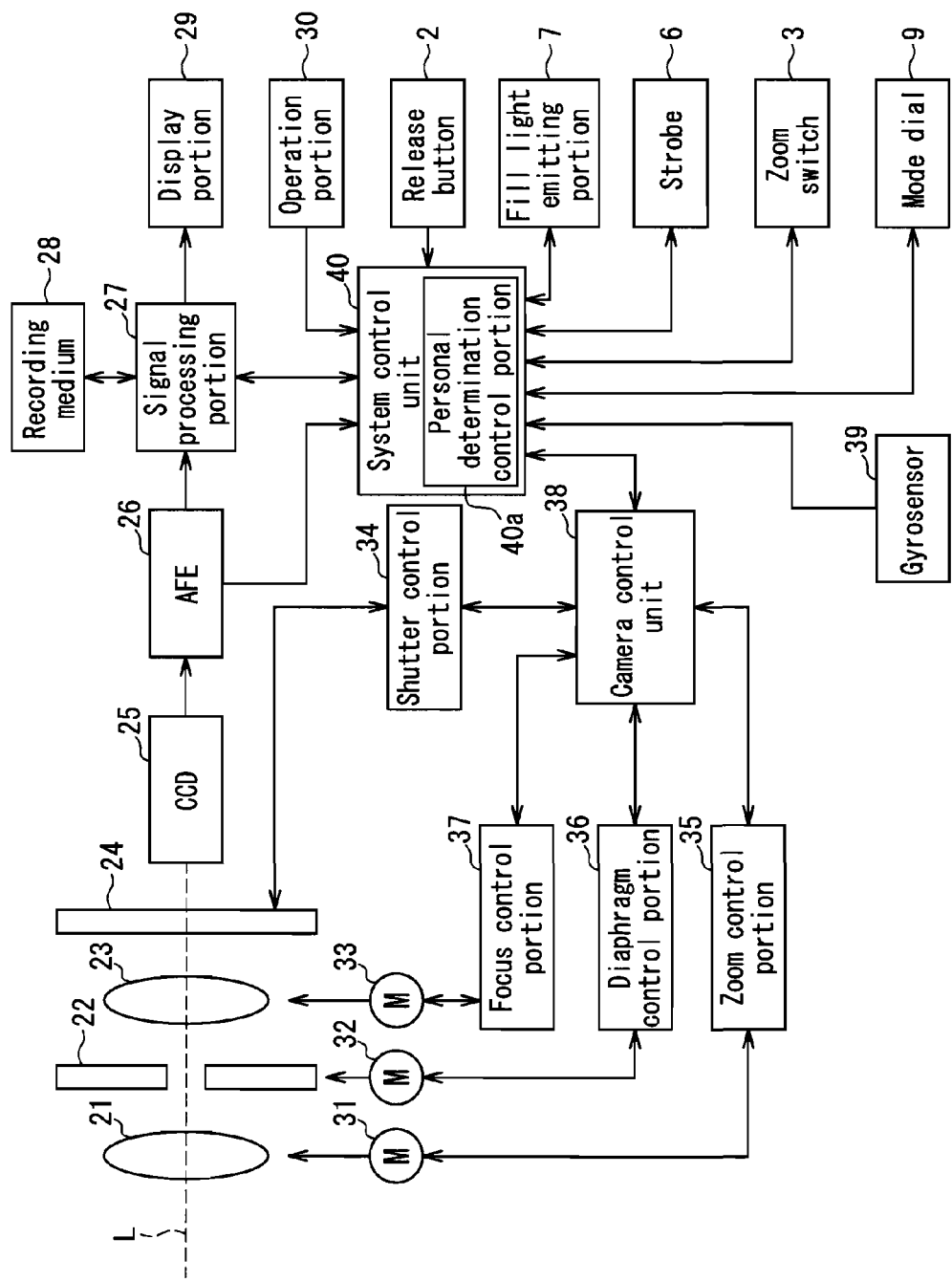
FIG. 4 is a block diagram showing the configuration of the imaging device according to one embodiment.

FIG. 4 is a diagram showing the internal configuration of the imaging device.

The zoom lens 21 is placed movably along the optical axis L and its operation is controlled by a zoom motor 31. By moving the zoom lens 21 in the optical axis L direction, an optical image formed on the imaging surface of a CCD 25 can be scaled up or down.

A diaphragm 22 is placed on the optical axis L and its operation is controlled by a motor 32. The diaphragm 22 is composed of a plurality of blades that can block the entry of light from outside, and the plurality of blades are placed movably in a direction substantially orthogonal to the optical axis. By moving the plurality of blades toward or away from the center of the optical axis, the amount of light that enters from outside and reaches the imaging surface of the CCD 25 can be adjusted. The diaphragm 22 may be a two-stage or multi-stage diaphragm.

The focus lens 23 is placed movably along the optical axis L and its operation is controlled by a focus motor 33. By moving the focus lens 23 in the optical axis direction, it is possible to adjust the focus of an optical image formed on the imaging surface of the CCD 25.

The shutter 24 is operated at a predetermined timing by a shutter control portion 34, and it allows light that enters the CCD 25 to pass through or blocks the light.

The CCD (Charged Coupled Device) 25 converts an optical image that enters thereinto through the zoom lens 21, the diaphragm 22, the focus lens 23 and the shutter 24 to an electric image, and outputs the electric image. Although a CCD image sensor is used for the CCD 25 in the present embodiment, an element that at least converts an optical image to an electric image, such as a CMOS image sensor, may be used for the CCD 25.

An AFE (Analog Front End) 26 converts the image signal as an analog signal outputted from the CCD 25 to image data as a digital signal. Further, the AFE 26 is an LSI circuit including a CDS (Correlated Double Sampling) circuit for removing noise components in the image signal, an AGC (Automatic Gain Control) amplifier for adjusting the size of the image signal, an A/D converter for converting the analog signal to the digital signal, etc (all of the components are not shown).

A signal processing portion 27 performs such processes as converting the format of the image data outputted from the AFE 26 to a format recordable in a recording medium 28 and displayable on the display portion 29 and adjusting the picture quality of the image data by controlling the white balance.

The recording medium 28 is a medium in which the image data and a variety of information associated with the image data are recorded with control performed by the signal processing portion 27. Although a memory card including a semiconductor memory is used for the recording medium 28 in the present embodiment, a media in another form, such as a disk medium, also may be used for the recording medium 28.

The display portion 29 can display images on the basis of the image data outputted from the signal processing portion 27. Specifically, the display portion 29 is composed of a display control circuit for converting image data inputted thereto to a displayable signal (e.g., conversion to an analog image signal) and a display for actually displaying images. For example, although a liquid crystal panel with a size of about 1 to 3 inches is used for the display, a display at least capable of displaying images, such as an EL (Electro-Luminescence) element, also may be used for the display.

An operation portion 30 allows a variety of operations of the imaging device 1 to be performed. Among the variety of operation portions shown in FIGS. 1 to 3, the operation portion 30 includes those other than the release button 2, the zoom switch 3 and the mode dial 9

Under the control of a camera control unit 38, the shutter control portion 34 controls the operation of the shutter 24. Specifically, the shutter control portion 34 controls a timing at which the shutter 24 is opened/closed on the basis of a shutter speed calculated by the camera control unit 38.

Under the control of the camera control unit 38, a zoom control portion 35 controls the operation of the motor 31 that drives the zoom lens 21. Specifically, the zoom control portion 35 controls, under the control of the camera control unit 38, the motor 31 to rotate in a forward or reverse direction when the zoom switch 3 (see FIG. 1, etc.) included in the operation portion 30 is operated toward the telephoto or wide-angle side.

Under the control of the camera control unit 38, a diaphragm control portion 36 controls the operation of the motor 32 that drives the diaphragm 22. Specifically, the diaphragm control portion 36 controls the operation of the motor 32 to open/close the diaphragm 22 on the basis of an aperture value calculated by the camera control unit 38.

Under the control of the camera control unit 38, a focus control portion 37 controls the operation of the motor 33 that drives the focus lens 23. Specifically, when the release button 2 is pressed halfway, the focus control portion 37 controls, under the control of the camera control unit 38, the motor 33 to rotate in a forward or reverse direction.

A system control unit 40 instructs the camera control unit 38 to control the operation of an imaging system that includes the shutter control portion 34, the zoom control portion 35, the diaphragm control portion 36, the focus control portion 37, etc. Specific details of the control will be described later.

A gyrosensor 39 is a sensor for detecting shaking and vibrations of the imaging device 1. Although results of detection performed by the gyrosensor 39 normally are utilized in operating an image stabilization feature that the imaging device 1 has, in the present embodiment, they also are utilized in determining whether the imaging device 1 is held by a user's hands or is fixed to a fixing means such as a tripod.

The system control unit 40 controls each component in the imaging device 1. Specific details of the control will be described later. Further, the system control unit 40 includes a personal determination control portion 40a for determining whether a person (face) is in a captured image or not.

Note that the zoom lens 21, the diaphragm 22, the focus lens 23, the shutter 24 and the CCD 25 are examples of the image pickup. Further, the image pickup, the AFE 26 and the signal processing portion 27 are examples of the image generator. Furthermore, the system control unit 40 is an example of the scene discriminator Further, the scene discriminator can discriminate one shooting scene from the other on the basis of an image generated by the image generator and/or information on the subject. The information on the subject is information other than those obtained from an image generated by the image generator and examples thereof include focus information, for example. Discrimination of shooting scenes may be performed with the use of one or both of an image generated by the image generator and the information on the subject.

Hereinafter, the basic operation of the imaging device at the time of shooting will be described.

When the power switch 4 (see FIG. 1) is operated and the power of the imaging device 1 is turned on, the system control unit 40 activates each component in the device. Next, an optical image entering from outside enters the CCD 25 through an object lens (not shown), the zoom lens 21, the diaphragm 22, the focus lens 23 and the shutter 24. The CCD 25 converts the entered optical image to an electric image and outputs the electric image to the AFE 26. The AFE 26 subjects the electric image outputted from the CCD 25 to signal processing, such as noise removal and digital conversion, and outputs the electric image to the signal processing portion 27. The signal processing portion 27 subjects the image data outputted from the AFE 26 to image processing, such as controlling the white balance, converts the image data to an image signal displayable on the display portion 29 and outputs the image signal to the display portion 29. The display portion 29 displays an image (through image) on the basis of the image signal outputted from the signal processing portion 27.

Next, when the zoom switch 3 is operated toward the telephoto or wide-angle side in a state in which the through image is displayed on the display portion 29, the camera control unit 38 instructs the zoom control portion 35 to perform the zoom operation. On the basis of the instruction given by the camera control unit 38, the zoom control portion 35 operates the motor 31 to move the zoom lens 21 in the optical axis direction by a predetermined amount. As a result, the optical image formed on the imaging surface of the CCD 25 can be scaled up or down.

Further, when the release button 2 is pressed halfway in the state in which the through image is displayed on the display portion 29, the system control unit 40 sends a control instruction to the camera control unit 38 and the camera control unit 38 instructs the focus control portion 37 to perform the focus operation. On the basis of the instruction given by the camera control unit 38, the focus control portion 37 operates the motor 33 to move the focus lens 23 in the optical axis direction by a predetermined amount. As a result, the optical image formed on the imaging surface of the CCD 25 can be brought into focus.

Subsequently, when the release button 2 is pressed fully, the camera control unit 38 instructs the shutter control portion 34 to perform the shutter operation. Specifically, after the electric shutter is operated to discard an unnecessary optical image that enters the CCD 25, an optical image is allowed to enter the CCD 25 for a predetermined time, the shutter 24 is closed to block an unnecessary optical image from entering the CCD 25 and the optical image is transmitted to the signal processing portion 27 from the CCD 25. The CCD 25 converts the entered optical image to an electric image and outputs the electric image to the AFE 26. The AFE 26 subjects the electric image outputted from the CCD 25 to signal processing, such as noise removal and digital conversion, and outputs the electric image to the signal processing portion 27. After subjecting the image data outputted from the AFE 26 to a variety of signal processing, such as controlling the white balance, the signal processing portion 27 converts the image data to an image signal displayable on the display portion 29 and outputs the image signal to the display portion 29. The display portion 29 displays an image (monitor image) on the basis of the image signal outputted from the signal processing portion 27. Further, the signal processing portion 27 converts the image data outputted from the AFE 26 to a recordable format (e.g., JPEG format) in the recording medium 28, and records the converted image data in the recording medium 28.

In addition to the above-mentioned modes, the mode of the imaging device according to the present embodiment can be switched to the "automatic scene selection mode" in which shooting scenes are recognized automatically on the basis of an image to be captured, and a variety of settings in the imaging device 1 are controlled on the basis of the results of the recognition.

2. Operation of Automatic Scene Selection Mode

Next, the operation when the mode dial 9 is operated to select the automatic scene selection mode will be described.

Automatically recognizable scenes in the automatic scene selection mode are "portrait", "scenery", "night scenery", "night scenery & portrait" and "macro". Further, when none of the scenes is recognized, an intelligent auto mode (hereinafter referred to as an "iA mode") is selected. In the automatic scene selection mode, any one of the five scenes or the iA mode is selected on the basis of an image to be captured, the focus information, etc. Hereinafter, the set contents of the imaging device 1 when each of the scenes is recognized will be described.

First, when the system control unit 40 automatically recognizes a person's face in an image to be captured (personal recognition), for example, a process on the basis of a portrait-specific program diagram is performed, the color reproduction setting is changed to increase the color saturation, gamma correction and skin color correction of the portrait setting are performed, the edge enhancement correction gain is lowered from a usual level, and the ISO sensitivity and the shutter speed are controlled on the basis of the tripod determination. Further, the preference is set to full aperture so as to blur the person's background. By performing such processing, shooting can be performed with emphasis being placed on the person as the subject. In the present embodiment, the mode that is set as a result of the personal recognition in the automatic scene selection mode will be referred to as an "intelligent portrait mode (hereinafter i portrait mode)".

Further, when the system control unit 40 recognizes that an image to be captured is of scenery, for example, gamma is corrected to obtain a high contrast, the edge enhancement correction gain is set higher and auto white balance control for scenery is performed. By performing such processing, the overall sharpness of the image can be increased, and it is possible to shoot expansive scenery. It is also possible to increase the skin color correction in the scenery recognition. This is to take the following case into consideration: a person is not recognized as the subject even though a portrait is taken. Since the personal recognition is performed on the basis of the presence or absence of a face, for example, a person may not be recognized in the following conditions: a person as the subject is not facing the imaging device 1 head on; the position of the subject is far away from the imaging device 1 and the subject's face is too small to be recognized; and the person is wearing a mask on the person's face. Under such conditions, although the picture quality of skin color portions of the person may deteriorate as a result of correcting gamma to obtain a high contrast and increasing the edge enhancement correction gain, the deterioration is prevented due to performing the skin color correction. In the present embodiment, the mode set as a result of the scenery recognition in the automatic scene selection mode will be referred to as an "intelligent scenery mode (hereinafter, i scenery mode)".

When the system control unit 40 recognizes that an image to be taken is of night scenery, for example, the shutter 24 is controlled to increase the shutter speed, a process on the basis of a night scenery specific program diagram is performed, gamma is corrected to obtain a high contrast and the ISO sensitivity and the shutter speed are controlled on the basis of the tripod determination. By performing such processing, it is possible to shoot vivid night scenery. In the present embodiment, the mode set as a result of the night scenery recognition in the automatic scene selection mode will be referred to as an "intelligent night scenery mode (hereinafter i night scenery mode)".

Further, when the system control unit 40 recognizes that an image to be captured includes night scenery and a person, the color reproduction setting is changed to reduce the color saturation, gamma correction and skin color correction of the portrait setting are performed, the edge enhancement correction gain is lowered than a usual level, the strobe is set to a red-eye reduction/slow sync mode, and the ISO sensitivity and the shutter speed are controlled on the basis of the tripod determination. By performing such processing, it is possible to shoot, when shooting an image including night scenery and a person (e.g., when taking a portrait with night scenery as the background), a bright image of the person as well as the night scenery as the background. In the present embodiment, the mode set as a result of the night scenery & portrait recognition in the automatic scene selection mode will be referred to as an "intelligent night scenery & portrait mode (hereinafter i night scenery & portrait mode).

When the system control unit 40 recognizes that the imaging device 1 is performing macro shooting, for example, the color saturation is reduced by changing the color reproduction setting if it is determined that the color is saturated, the edge enhancement correction gain is lowered and the ISO sensitivity and the shutter speed are controlled on the basis of the tripod determination. By performing such processing, it is possible to shoot a high-quality image of the subject in a close-up range. In the present embodiment, the mode set as a result of the macro recognition in the automatic scene selection mode will be referred to as an "intelligent macro mode (hereinafter i macro mode)".

When an image to be captured is recognized as none of the above-mentioned scenes, the iA mode is selected. The iA mode may be a so-called "programmed automatic exposure mode" in which the imaging device 1 automatically determines the combination of an aperture value and a shutter speed in accordance with the brightness of the subject, and obtains an appropriate exposure value, or the imaging device 1 automatically determines whether the subject is moving or not and increases or reduces the sensitivity in accordance with the determination.

Hereinafter, the automatic scene selection operation when the imaging device 1 is in each state will be described.

[2-1. Operation in the Monitor State]

The automatic scene selection operation when the imaging device 1 is in a monitor state will be described. Note that the monitor state is a state in which a through image is displayed on the display portion 29 on the basis of an image captured by the CCD 25. Further, when the mode dial 9 is operated to select the automatic scene selection mode in the monitor state, the mode of the imaging device 1 is determined as any one of the "i portrait mode", the "i scenery mode", the "i macro mode" and the "iA mode" as a result of the scene recognition.

Figure 5:
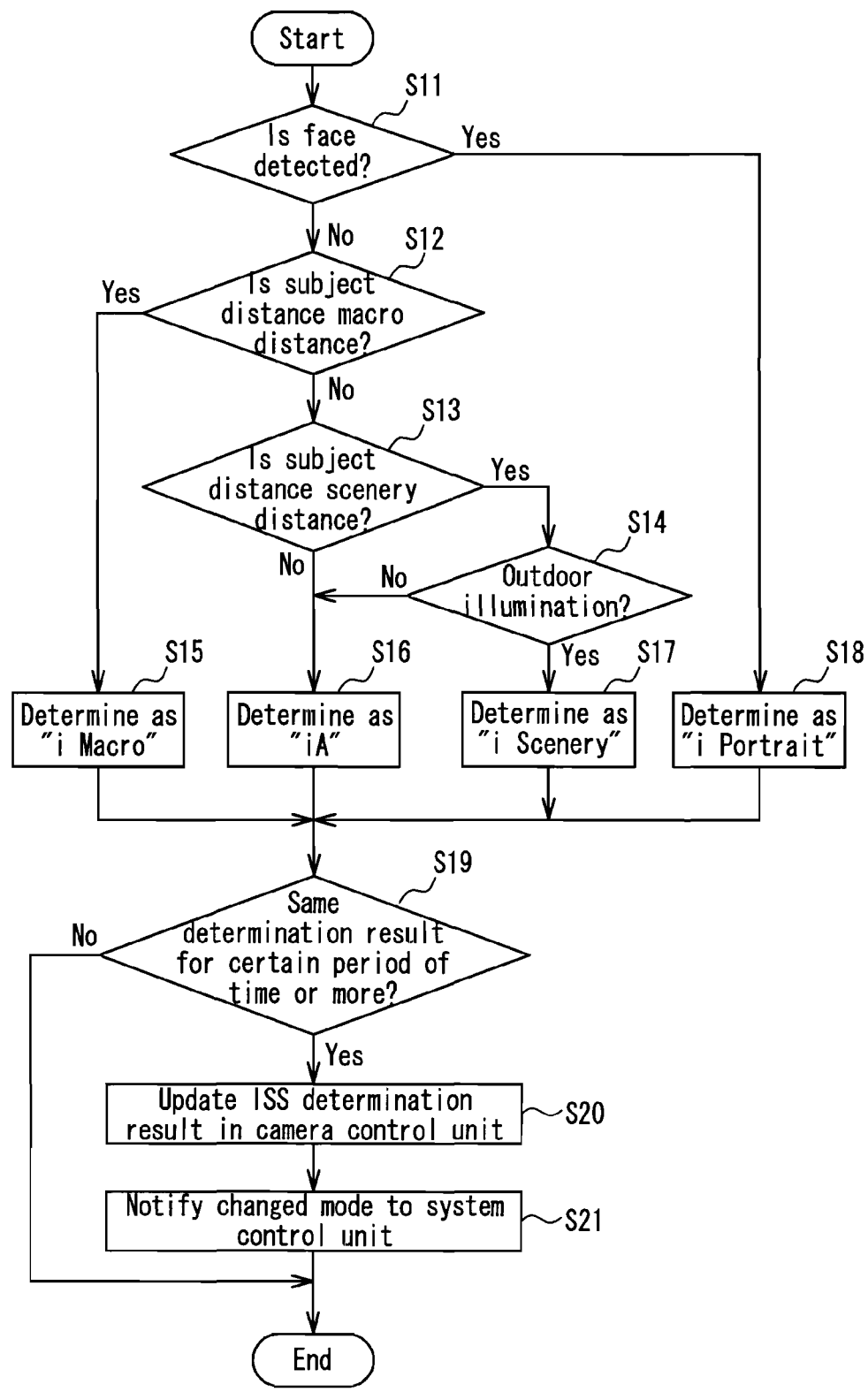
FIG. 5 is a flowchart for explaining scene discriminating operation in a monitor state.

FIG. 5 is a flowchart showing the flow of the automatic scene selection operation in the monitor state. First, when the mode dial 9 is operated to select the automatic scene selection mode, the system control unit 40 controls the camera control unit 38 to set each of the focus setting, the aperture setting, the white balance setting, etc. to an initial value. Note that the initial value used herein refers to the setting value of each component when the automatic scene recognition is not performed.

When the mode of the imaging device 1 is shifted to the automatic scene selection mode, the system control unit 40 reads image data from the signal processing portion 27 and determines, at the personal determination control portion 40a, whether or not a person's face is present in the image (S11). When it is determined at the personal determination control portion 40a that a person's face is present in the image, the system control unit 40 sets the i portrait mode (S18). At this time, the system control unit 40 only performs the personal recognition, and does not yet perform the image processing or make changes to a variety of settings conforming to the i portrait mode.

Further, when a person's face is not recognized at the personal determination control portion 40a at step S11, the system control unit 40 then determines the subject distance on the basis of the positional relationship between the zoom lens 21 and the focus lens 23 (S12). At this time, the system control unit 40 determines that the subject distance is one of the following: a "macro distance" as the shortest distance; a "scenery distance" as the longest distance; a "normal distance" as an intermediate distance between the macro and scenery distances; and "unknown" where the subject distance is unmeasurable. It is assumed that there are other determinable subject distances in the present embodiment in addition to those mentioned above.

Further, in the present embodiment, threshold values for determining the "macro distance", the "scenery distance" and the "normal distance" are variable in accordance with the zoom magnification. The reasons for adopting variable threshold values for determining the distances are as follows. The size of the major subject in a shot image (proportion of the size of the major subject to the angle of view) at the wide-angle end and that at the telephoto end become almost the same when "the subject distance at the wide-angle end is 10 cm and the subject distance at the telephoto end is 1.5 m". Although the subject distance to be determined as the macro distance (actual distance) at the wide-angle end and that at the telephoto end are completely different from each other, they (macro distance, etc.) become the same when the angle of view is similar. Therefore, by allowing threshold values for determining the subject distance to be variable in accordance with the zoom magnification, it is possible to bring the angle of view determined as the macro distance at the wide-angle end and that at the telephoto end into conformity with each other by changing the zoom magnification.

When the subject distance is determined as the macro distance, the system control unit 40 sets the i macro mode (S15). At this time, the system control unit 40 only performs the macro recognition, and does not yet perform the image processing or make changes to a variety of settings conforming to the i macro mode.

Further, when the subject distance is determined as the scenery distance (Yes at S13), the system control unit 40 determines whether the shooting is taking place in outdoors or not on the basis of the illumination in the shooting environment (S14). Specifically, an EV value as brightness information is calculated, and on the basis of the size of the EV value, whether the illumination corresponds to "low illumination", "normal illumination" or "outdoor illumination" is determined. It is assumed that there are other kinds of determinable illumination in the present embodiment in addition to those mentioned above.

When the illumination is determined as the outdoor illumination (outdoor shooting) at step S14, the system control unit 40 sets the i scenery mode (S17). At this time, the system control unit 40 only performs the scenery recognition, and does not yet perform the image processing or make changes to a variety of settings conforming to the i scenery mode.

Further, when the illumination is not determined as the outdoor illumination at step S14, the system control unit 40 sets the iA mode (S16).

Thereafter, steps S11 to S18 are performed at a predetermined time interval.

Next, the system control unit 40 determines whether or not the mode determined at any of steps S15 to S18 has lasted for a certain period of time (e.g., 10 VD, 1 VD=1/30 sec.) (S19).

When it is determined at step S19 that one mode has lasted for the certain period of time (e.g., 10 VD) or more, the system control unit 40 updates the information of an ISS (Intelligent Scene Selector) determination result held in the camera control unit 38 (S20). The camera control unit 38 controls each control portion so that the settings of the imaging system and image processing are performed on the basis of the updated ISS determination result.

Next, the camera control unit 38 notifies the system control unit 40 that the information of the ISS determination result is updated (S21).

Then, the system control unit 40 generates image data of an OSD (On Screen Display) icon that is to be superimposed on an image displayed on the display portion 29. The signal processing portion 27 superimposes the OSD image data generated by the system control unit 40 on image data outputted from the AFE 26, and outputs the superimposed image data to the display portion 29. The display portion 29 displays an image on the basis of the image data outputted from the signal processing portion 27.

Figure 8A:
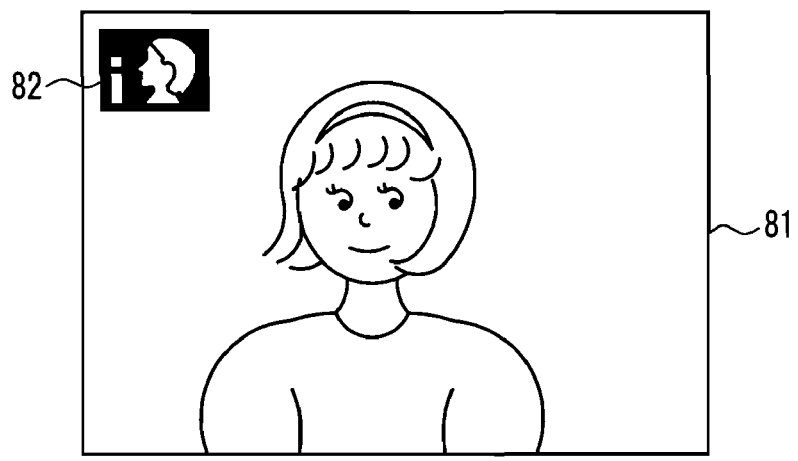
FIG. 8A is a schematic diagram showing an example image displayed at the time of automatic scene selection.
Figure 8B:
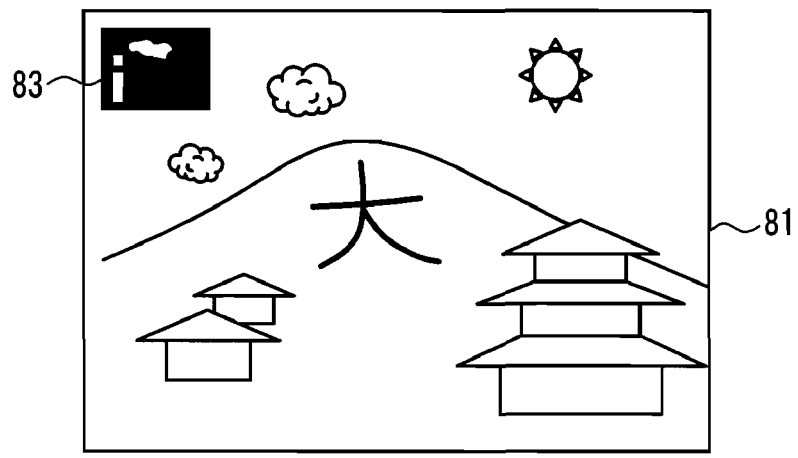
FIG. 8B is a schematic diagram showing an example image displayed at the time of the automatic scene selection.
Figure 8C:
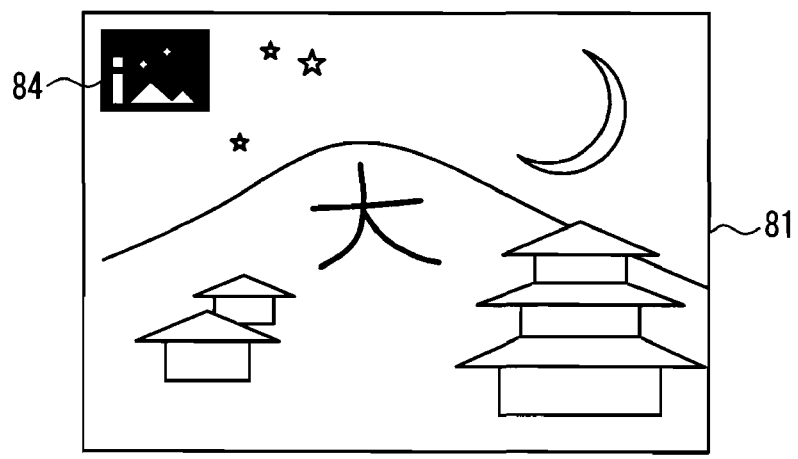
FIG. 8C is a schematic diagram showing an example image displayed at the time of the automatic scene selection.
Figure 8D:
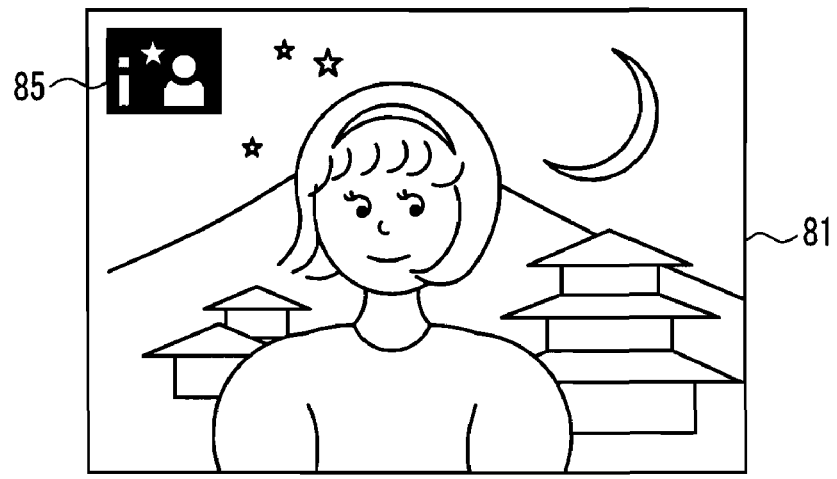
FIG. 8D is a schematic diagram showing an example image displayed at the time of the automatic scene selection.
Figure 8E:
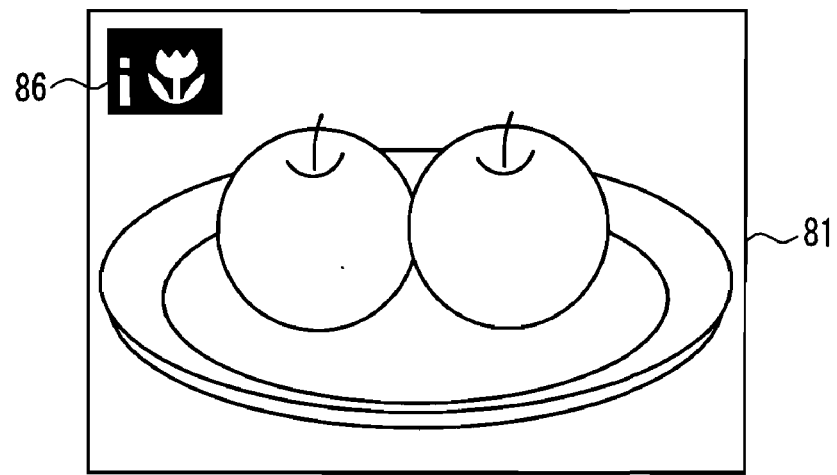
FIG. 8E is a schematic diagram showing an example image displayed at the time of the automatic scene selection.

FIG. 8A is a diagram showing an example of a displayed image when the i portrait mode is set. As shown in the drawing, an icon 82 indicating that the i portrait mode is set is superimposed on an image of the subject 81 and is displayed. FIG. 8B is an example of a displayed image when the i scenery mode is set. Similarly, an icon 83 indicating that the i scenery mode is set is superimposed on the image of the subject 81 and is displayed. Further, FIG. 8E is an example of a displayed image when the i macro mode is set. Similarly, an icon 86 indicating that the i macro mode is set is superimposed on the image of the subject 81 and is displayed. Note that the color and size of each icon may be changed temporarily when the mode is changed. For example, each of the icons normally is displayed in red and in small size but it may be temporarily displayed in blue and in large size when the mode is changed. By having such a configuration, it is possible visually to notify a user that the mode is changed.

As described above, when the mode of the imaging device 1 is shifted to the automatic scene selection mode in the monitor state, the mode of the imaging device 1 is determined as any one of the i portrait mode, the i scenery mode, the i macro mode and the iA mode on the basis of the EV value and the conditions of the optical system such as the condition of the zoom lens 21. And on the basis of the determination result, the settings of the imaging system, etc. in the imaging device 1 are changed automatically. By having such a configuration, there is no need for a user to select the shooting mode suited for the shooting scene, and consequently the operability can be improved.

[2-2. Operation at the Time of Operating the Release Button]

The operation at the time of operating the release button 2 when the imaging device 1 is in the automatic scene selection mode will be described. The types of operations performable on the release button 2 include the "halfway pressing operation" in which the release button 2 is pressed about a half of the entire stroke and the "full pressing operation" in which the release button 2 is pressed the entire stroke. Generally, the imaging device performs AF operation when the release button 2 is pressed halfway, and shooting can be performed when the release button 2 is pressed fully from the state of being pressed halfway. In the present embodiment, after the release button 2 is pressed halfway or pressed fully, the shooting mode suited for the shooting scene is selected automatically with consideration given to, in addition to the conditions of the optical system and the EV value, need or no need for AF auxiliary light and the difference in brightness between before and after the emission of AF auxiliary light. In the following, the operation when the release button 2 is pressed halfway will be described as an example.

Figure 6A:
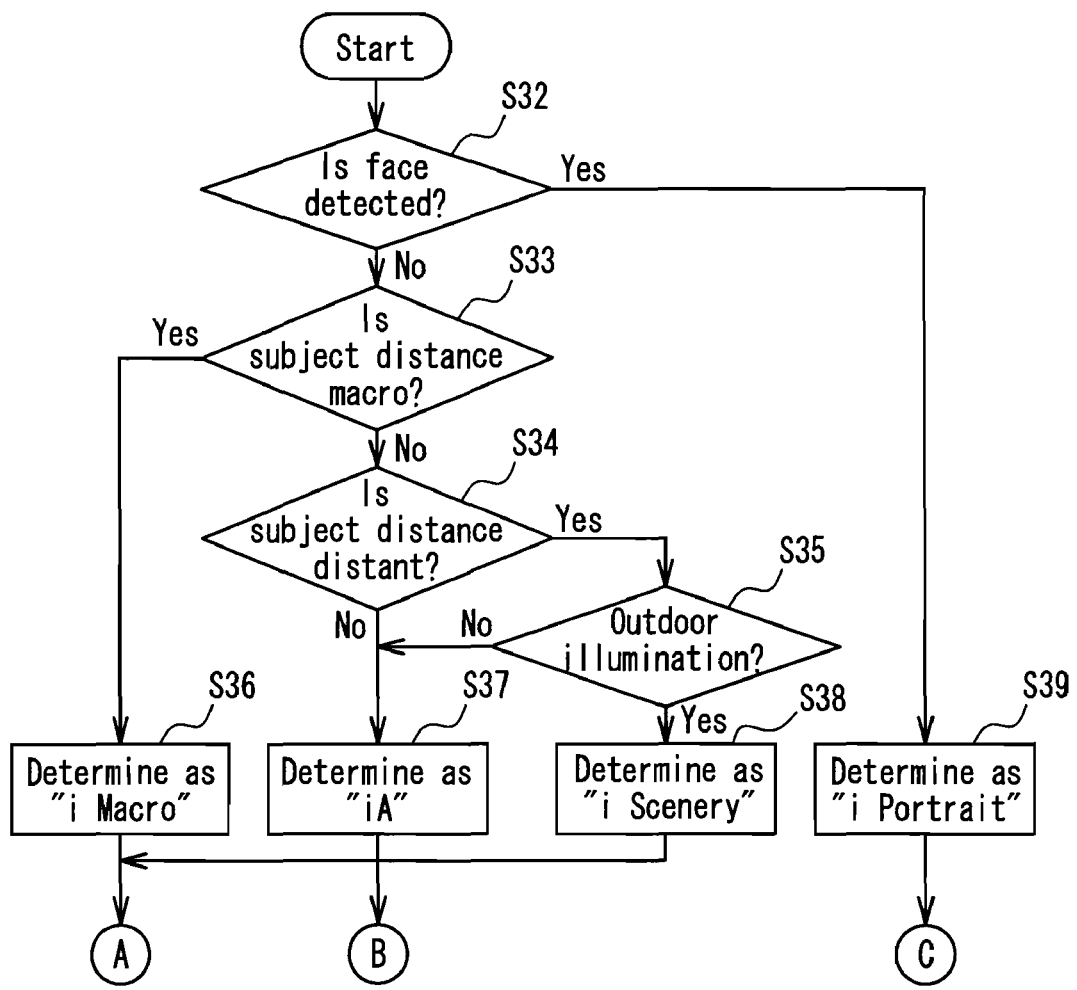
FIG. 6A is a flowchart for explaining the operation at the time of operating a release button.
Figure 6B:
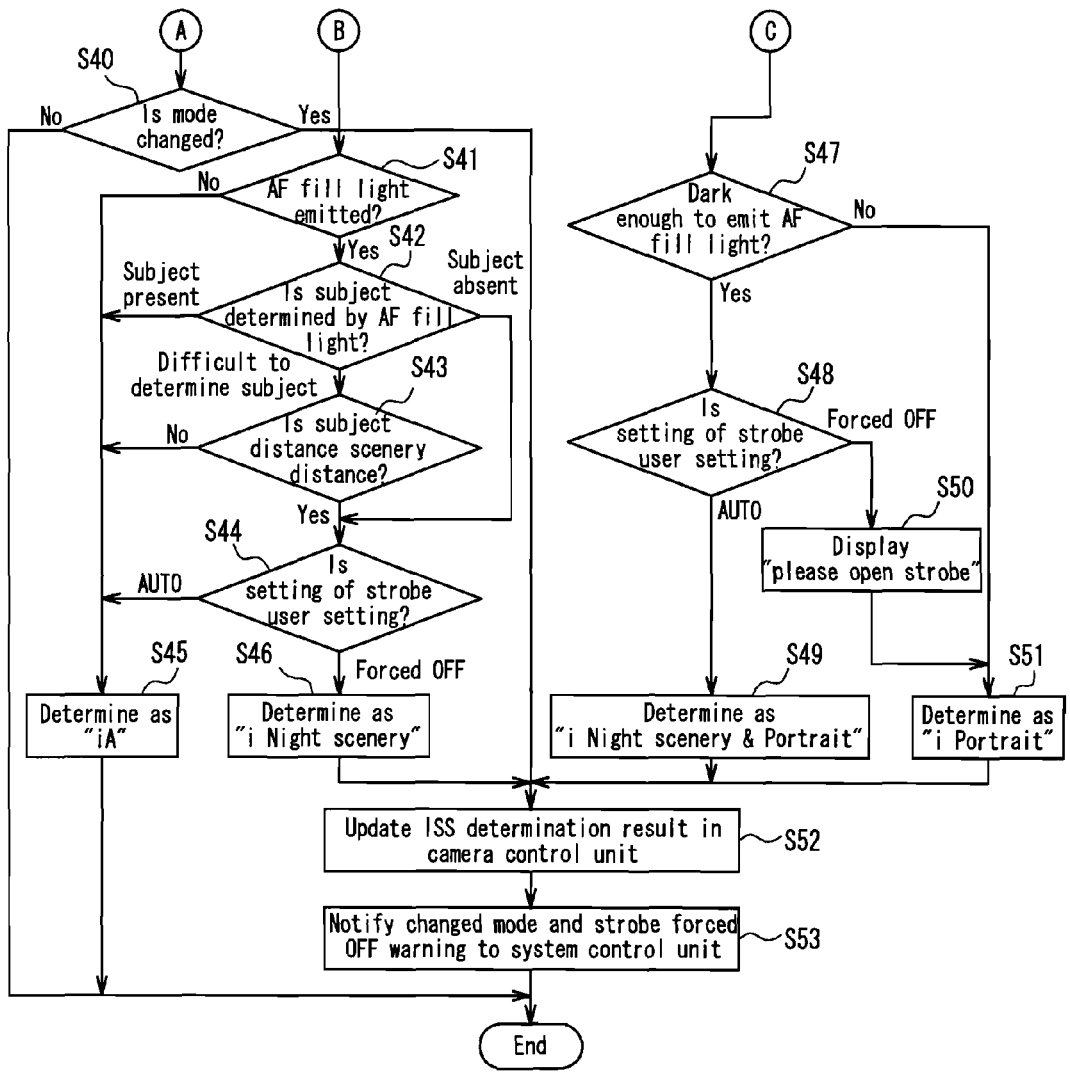
FIG. 6B is a flowchart for explaining the operation at the time of operating a release button.

FIGS. 6A and 6B are flowcharts each showing the flow when the release button 2 is operated in the automatic scene selection mode. Note that the flow in FIG. 6A is linked to the flow in FIG. 6B through the portions A, B and C.

First, when the release button 2 is pressed halfway at the time the imaging device 1 is in the monitor state (the state in which the flow shown in FIG. 5 ended), the camera control unit 38 controls the focus control portion 37 to perform AF operation.

Next, the system control unit 40 reads image data from the signal processing portion 27 and determines, at the personal determination control portion 40a, whether or not a person's face is present in the image (S32). When it is determined at the personal determination control portion 40a that a person's face is present in the image, the system control unit 40 sets the i portrait mode (S39). At this time, the system control unit 40 only performs the personal recognition, and does not yet perform the image processing or make changes to a variety of settings conforming to the i portrait mode.

Further, when a person's face is not recognized at the personal determination control portion 40a at step S32, the system control unit 40 then determines the subject distance on the basis of the positional relationship between the zoom lens 21 and the focus lens 23 (S33). At this time, the subject distance is determined as one of the following: the "macro distance" as the shortest distance; the "scenery distance" as the longest distance; the "normal distance" as an intermediate distance between the macro and scenery distances; and "unknown" where the subject distance is unmeasurable. When the subject distance is determined as the macro distance, the system control unit 40 sets the i macro mode (S36). At this time, the system control unit 40 only performs the macro recognition, and does not yet perform the image processing or make changes to a variety of settings conforming to the i macro mode.

Further, when the subject distance is determined as the scenery distance (Yes at S34), the system control unit 40 determines whether the shooting is taking place outdoors or not on the basis of the illumination in the shooting environment (S35). Specifically, the system control unit 40 calculates an EV value as brightness information, and on the basis of the size of the EV value, determines whether the illumination corresponds to any of the "low illumination", the "normal illumination" and the "outdoor illumination".

When the illumination is determined as the outdoor illumination (outdoor shooting) as a result of step S35, the system control unit 40 sets the i scenery mode (S38). At this time, the system control unit 40 only performs the scenery recognition, and does not yet perform the image processing or make changes to a variety of settings conforming to the i scenery mode.

Further, when the illumination is not determined as the outdoor illumination as a result of step S35, the system control unit 40 sets the iA mode (S37).

The scene determination process indicated by steps S32 to S39 is performed only once when the release button 2 is pressed halfway.

When the mode of the imaging device 1 is determined as the i macro mode (S36) or the i scenery mode (S38) as a result of the scene determination process, the system control unit 40 determines whether or not the determination result is different from that in the monitor state (S40). When the determination result is different, the information of the ISS determination result in the camera control unit 38 is updated on the basis of the determination result in the present flow (S52). Further, when the determination result is not different, the flow shown in FIGS. 6A and 6B ends. In other words, the scene determination result in the monitor state is kept.

Further, when the mode of the imaging device 1 is determined as the i portrait mode as a result of the scene determination process (S39), the system control unit 40 determines, on the basis of the EV value calculated by the camera control unit 38, whether or not the illumination requires the emission of AF auxiliary light from the auxiliary light emitting portion 7 (S47). Note that AF auxiliary light is emitted when the amount of light in the shooting environment is insufficient so that an image necessary for performing AF operation is difficult to obtain. AF operation is performed by detecting the AF auxiliary light reflected by the subject. Whether to emit AF auxiliary light or not is determined on the basis of the brightness of the captured image. The brightness of the image may be measured by providing the imaging device with an illuminometer.

When it is determined at step S47 that the ambient illumination is not dark enough to emit AF auxiliary light, the system control unit 40 determines that the mode of the imaging device 1 is the i portrait mode (S51). When it is determined at step S47 that the ambient illumination is dark enough to emit AF auxiliary light, the system control unit 40 confirms the flash setting of the strobe 6 (S48). When the flash setting of the strobe 6 is set to "AUTO" (mode in which flash/non-flash is automatically determined in accordance with the amount of light in the shooting environment), the system control unit 40 determines that the mode of the imaging device 1 is the i night scenery & portrait mode (S49). Further, when the flash setting of the strobe 6 is set to "forced OFF", the system control unit 40 causes the display portion 29 to superimpose a message such as "please open the strobe" on the displayed image (S50), and determines that the mode of the imaging device 1 is the i portrait mode (S51). In other words, once the mode of the imaging device 1 is determined as the i portrait mode at step S39, the system control unit 40 again determines that the mode of the imaging device 1 is the i portrait mode or the i night scenery & portrait mode on the basis of the illumination in the shooting environment and the flash setting of the strobe 6.

The message displayed at step S50 is only effective for a strobe that is housed in the body of the imaging device 1 (see JP 2004-151684 A, for example). When the strobe is not a housed type, a message such as "please turn ON the setting for enabling/disabling flash of the strobe" may be displayed or no message may be displayed. When a message is not displayed, the flash setting of the strobe is set automatically to ON or OFF.

Further, when it is determined that the mode of the imaging device 1 is the iA mode as a result of the scene determination process (S37), the system control unit 40 determines whether to emit AF auxiliary light from the auxiliary light emitting portion 7 or not on the basis of the EV value calculated by the camera control unit 38 (S41). That is, when the ambient illumination in the shooting environment is so small that AF operation is difficult to be performed, the system control unit 40 sets to emit AF auxiliary light. Further, when the ambient illumination in the shooting environment is sufficient for performing AF operation, the system control unit 40 sets not to emit AF auxiliary light.

When AF auxiliary light is not emitted at step S41, the system control unit 40 determines that the mode of the imaging device 1 is the iA mode (S45). Further, when AF auxiliary light is emitted at step S 41, the system control unit 40 determines the presence or absence of the subject on the basis of the presence or absence of the AF auxiliary light reflected by the subject (S42). Specifically, the system control unit 40 compares the brightness of the captured image prior to the emission of the AF auxiliary light with the brightness of the captured image at the time the AF auxiliary light is emitted, and determines the presence or absence of the subject on the basis of the brightness difference. When the subject is present, the AF auxiliary light is reflected by the subject, so that the brightness difference becomes large. On the other hand, when the subject is absent, the AF auxiliary light is not reflected, so that the brightness difference becomes small.

When it is determine at step S42 that the subject is present, the system control unit 40 determines that the mode of the imaging device 1 is the iA mode (S45). Further, when it is determined at step S44 that the subject is absent, the system control unit 40 performs step S42. Further, when it is difficult to determine the presence or absence of the subject at step S42 (when the amount of the AF auxiliary light reflected by the subject is small, etc.) the system control unit 40 determines whether the subject distance is the scenery distance or not (S43). The method of determining the subject distance is similar to that at step S33 described above.

When it is determined at step S43 that the subject distance is not the scenery distance, the system control unit 40 determines that the mode of the imaging device 1 is the iA mode (S45). Further, when it is determined at step S43 that the subject distance is the scenery distance, the system control unit 40 confirms the flash setting of the strobe 6 (S44).

When the flash setting of the strobe 6 is set to "AUTO" at step S44, the system control unit 40 determines that the mode of the imaging device 1 is the iA mode (S45). Further, when the flash setting of the strobe 6 is set to "forced OFF" at step S44, the system control unit 40 determines that the mode of the imaging device 1 is the i night scenery mode (S46). Note that the imaging device may be configured such that the mode of the imaging device 1 can be determined as the i night scenery mode even when the flash setting of the strobe 6 is set to "AUTO".

When the mode of the imaging device 1 is determined as any one of the i portrait mode (S51), the i night scenery mode (S46) and the i night scenery & portrait mode (S49) through the above-described process, the information of the ISS determination result in the camera control unit 38 is updated (S52). Specifically, the settings of AE (Auto Exposure), white balance and picture quality are changed in accordance with the determined mode.

Next, the system control unit 40 generates the image data of an icon that is superimposed on an image to be displayed on the display portion 29. The signal processing portion 27 superimposes the image data of the icon generated by the system control unit 40 on image data outputted from the AFE 26, and outputs the superimposed image data to the display portion 29. The display portion 29 displays an image on the basis of the image data outputted from the signal processing portion 27. (S53). FIGS. 8A to 8E each show an example of an image displayed on the display portion 29. At this time, when the flash setting of the strobe 6 is set to forced OFF, the information concerning the flash setting also is superimposed on the image.

As described above, when the release button 2 is operated (pressed halfway or pressed fully) at the time the imaging device 1 is in the automatic scene selection mode, the mode of the imaging device 1 is determined as any one of the i portrait mode, the i scenery mode, the i night scenery mode, the i night scenery & portrait mode, the i macro mode and the iA mode on the basis of the conditions of the optical system such as the condition of the zoom lens 21. And on the basis of the determination result, the settings of the imaging system, etc. in the imaging device 1 are changed automatically. By having such a configuration, there is no need for a user to select the shooting mode suited for the shooting scene, and consequently the operability can be improved.

Although the process flow when the release button 2 is pressed halfway has been described above, a similar process is performed even when the release button 2 is pressed fully. When the release button 2 is pressed halfway as described above, an icon displayed on the display portion 29 is displayed at the time the recognition of the scene is finalized (S53) as shown in FIGS. 8A to 8E. However, when the release button 2 is pressed fully in the monitor state, even if an icon is displayed at the timing in step S53, the icon is only displayed momentarily. Therefore, it is difficult for a user to recognize the meaning of the icon. Accordingly, in the present embodiment, when the release button 2 is pressed fully in the monitor state, the icon is displayed at the time of auto review. Thus, a user can recognize the icon visually. Note that the auto review is a feature for, when the release button 2 is pressed fully and an image is captured as a result of the operation of the shutter 24, causing the display portion 29 to display the captured image.

Further, when it is determined at step S44 that the flash setting of the strobe 6 is "AUTO" and the strobe 6 is in a state of automatically flashing due to the amount of light in the shooting environment in fact being small, the system control unit 40 sets the flash setting of the strobe 6 to the "red-eye reduction/slow sync mode". The red-eye reduction/slow sync mode is a mode in which not only night scenery as the background can be shot brightly by flashing the strobe 6 and reducing the shutter speed but also the red-eye effect in a person's eyes is reduced. This mode is suited for shooting a portrait with night scenery as the background.

Further, when the mode of the imaging device 1 is determined as the i night scenery mode or the i night scenery & portrait mode, the system control unit 40 may determine whether the imaging device 1 is held by a user's hands or fixed to a fixing means such as a tripod, and on the base of the determination result, change the shutter speed. For example, when the imaging device 1 is held by a user's hands, a high shutter speed (e.g., ⅛ sec. or less) is set to suppress jittering of an image as much as possible, and when the imaging device 1 is fixed to a fixing means, a slow shutter speed (e.g., about 1 to 8 sec.) is set to shoot a bright picture.

[2-3. Operation at the Time of Recording]

In the present embodiment, after the release button 2 is pressed fully, the shooting mode suited for a shooting scene is selected automatically with consideration given to the flash setting of the strobe and the brightness difference between before and after the pre flash of the strobe.

Figure 7:
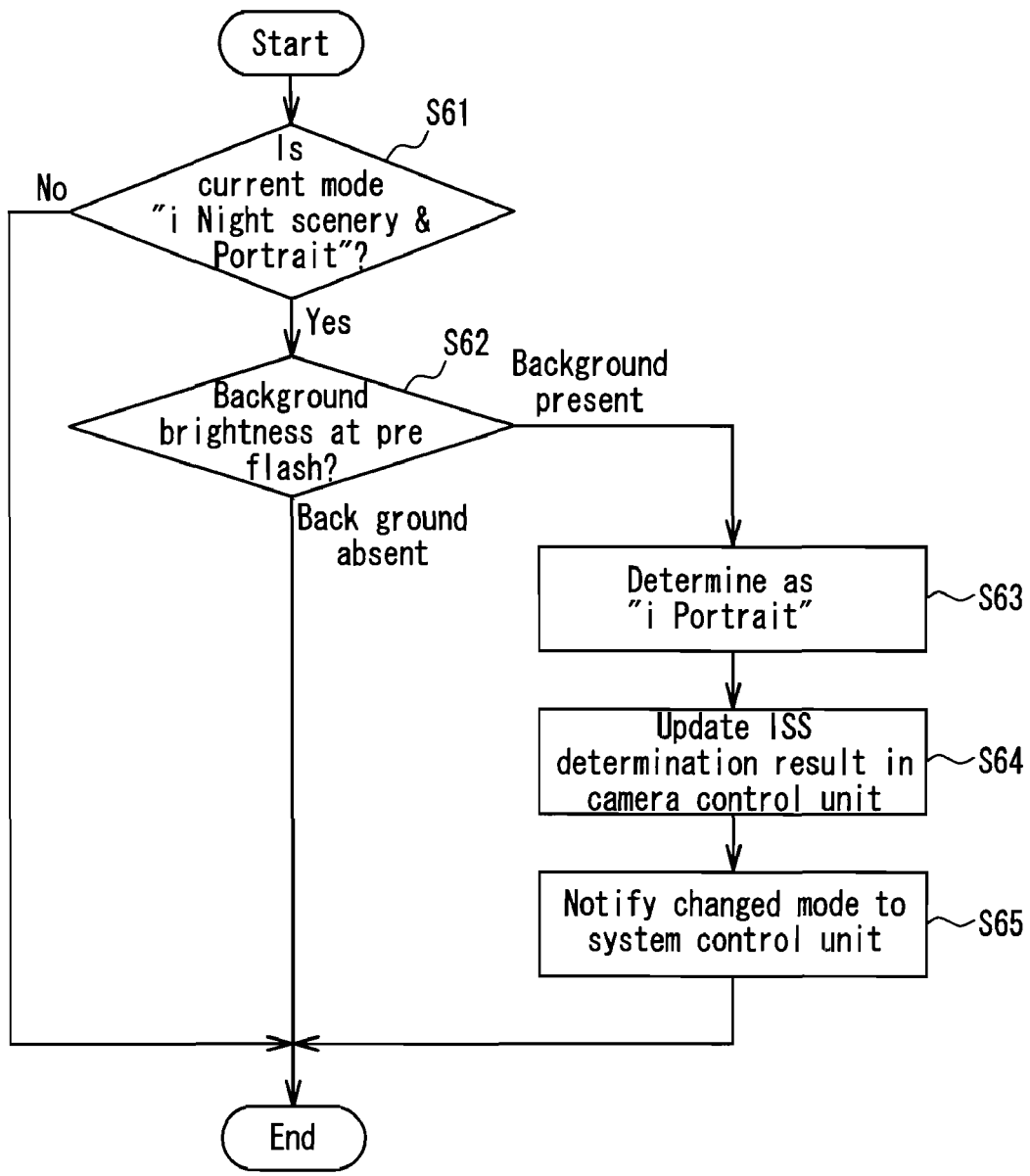
FIG. 7 is a flowchart for explaining recording operation.

FIG. 7 is a flowchart showing the process flow in the automatic scene selection mode after the release button 2 is pressed fully. The process shown in FIG. 7 is performed only once after the strobe 6 is pre-flashed. Accordingly, the process shown in FIG. 7 is performed only when the flash setting of the strobe 6 is set to "AUTO".

When the release button 2 is pressed fully, first, whether or not the current mode of the imaging device 1 is the i night scenery & portrait mode is determined (S61). This depends upon the result of the scene determination shown in FIGS. 6A and 6B.

When it is determined at step S61 that the mode of the imaging device 1 is other than the i night scenery & portrait mode, the system control unit 40 ends the process. Further, it is determined at step S61 that the mode of the imaging device 1 is the i night scenery & portrait mode, the system control unit 40 determines the presence or absence of the background (S62). Specifically, the system control unit 40 determines the difference between the brightness of the background portion (portion other than the subject) in the image captured prior to the pre flash of the strobe 6 and that of the background portion of the image captured after the pre flash of the strobe 6. When the difference is equal to or larger than a predetermined value, the system control unit 40 determines that the background is present. Further, when the difference is less than the predetermined value, the system control unit 40 determines that the background is absent. In other words, when the background is present, light is reflected by the background at the time of the pre flash. Thus, the brightness becomes higher than that of the image captured prior to the pre flash. On the other hand, when the background is absent, light will not be reflected by the background even when the strobe is pre-flashed. Thus, the brightness does not change significantly from that of the image captured prior to the pre flash. In this way, the presence or absence of the background can be determined on the basis of the brightness difference between before and after the pre flash.

When it is determined at step S62 that the background is present, the system control unit 40 determines that the mode of the imaging device 1 is the i portrait mode (S63). Further, when it is determined at step S62 that the background is absent, the system control unit 40 maintains the i night scenery & portrait mode and maintains the amount set at step S49 in FIG. 6B as the flash amount of the strobe 6.

When the mode of the imaging device 1 is determined as the i portrait mode (S63), the system control unit 40 updates the information of the ISS determination result in the camera control unit 38 (S64). Specifically, the system control unit 40 updates the information of the ISS determination result on the basis of the settings of AE, white balance and picture quality and the flash amount of the strobe 6, all of which are set in agreement with the i portrait mode. Here, the ISO sensitivity at the time the strobe 6 is pre-flashed in the i night scenery & portrait mode (when the imaging device 1 is held by a user's hands) is set to a value larger than a usual level (e.g., 400) for the following reasons. To prevent the deterioration in the picture quality resulting from jittering, a slow shutter speed cannot be set. Instead, a large sensitivity value is set to compensate for the brightness. In contrast, since the i portrait mode is not a mode for shooting the background brightly, the ISO sensitivity is set to a value (e.g., 100) smaller than a usual setting or that in the i night scenery & portrait mode (when the imaging device 1 is held by a user's hands). When the mode of the imaging device 1 is determined as the i portrait mode after the pre flash, the ISO sensitivity is set to 100 at the time of main flashing while the ISO sensitivity is set to 400 when the flash amount is calculated on the basis of the pre flash. Thus, the image becomes dark when main flashing is carried out in the flash amount calculated at the time of the pre flash. Therefore, the flash amount calculated at the time of the pre flash is multiplied by a coefficient, and when the brightness is still insufficient, the ISO sensitivity is increased. Accordingly, in a case where the i night scenery & portrait mode is set when the release button 2 is pressed halfway (S49 in FIG. 6) and then the mode is changed to the i portrait mode after the pre flash (S63), the image becomes dark. So at step S64, the ISS determination result is updated to a value in which the amount equivalent to the image being darkened is taken into consideration. The camera control unit 38 controls the imaging system on the basis of the updated ISS determination result with consideration given to the amount equivalent to the image being darkened.

It is also possible to perform the pre-flash while setting the ISO sensitivity to 100 in the night scenery & portrait mode (when the imaging device 1 is held by a user's hands). In this case, when the strobe 6 is pre-flashed at the ISO sensitivity 100 and the determination result is still the i night scenery & portrait mode, the image becomes too bright if the strobe 6 carries out main flashing in the flash amount calculated at the time of the pre flash (i.e., because the imaging device 1 is held by a user's hands, in order to prevent the deterioration in the picture quality resulting from jittering, the slow shutter speed cannot be set. To compensate for the corresponding brightness, the ISO sensitivity is set to 400). Therefore, by dividing the calculated flash amount by a given coefficient, the flash amount is reduced and an image with appropriate brightness can be shot.

Next, the system control unit 40 generates the image data of an icon that is to be superimposed on an image to be displayed on the display portion 29. The signal processing portion 27 superimposes the OSD image data generated by the system control unit 40 on image data outputted from the AFE 26, and outputs the superimposed image data to the display portion 29. The display portion 29 displays an image on the basis of the image data outputted from the signal processing portion 27. (S65). FIGS. 8A to 8E each show an example of an image displayed on the display portion 29.

Table 1 provides a summary of the scene discrimination and the set contents on the basis of the discrimination results.

TABLE 1

| | Information used in determining scenes (o: used, x: not used) | | | | | | | |
|---|---|---|---|---|---|---|---|---|
| Determined Scene | Face Info | Focus Info | EV Info | AF auxiliary light reflection Info | Pre flash reflection Info | Strobe Setting | Detection Timing | Effects |
| i Portrait | o | x | x | x | x | x | | Portrait specific program diagram |
| | | | | | | | Monitor | Increase saturation setting γPortrait setting |
| | | | | | | | Halfway Pressing | Skin detail: Portrait setting |
| | | | | | | | Full Pressing | Aperture correction gain smaller than usual ISO sensitivity on the basis of tripod determination/shutter speed control |

TABLE 1-continued

| | | | | | | | | |
|---|---|---|---|---|---|---|---|---|
| i Scenery | x | o | o | x | x | x | Monitor | γhard setting |
| | | | | | | | | Increasing aperture correction gain |
| | | | | | | | Halfway Pressing | Scenery specific AWB control |
| i Night Scenery | x | o | o | o | x | o | | Night scenery specific program diagram |
| | | | | | | | Halfway Pressing | Night scenery specific AWB control |
| | | | | | | | | γhard setting |
| | | | | | | | | ISO sensitivity on the basis of tripod determination/shutter speed control |
| i Night Scenery & Portrait | o | x | o | x | o | o | | Increase saturation setting |
| | | | | | | | | γPortrait setting |
| | | | | | | | Halfway Pressing | Skin detail: Portrait setting |
| | | | | | | | Full Pressing | Aperture correction gain smaller than usual |
| | | | | | | | | Flash red-eye slow sync |
| | | | | | | | | ISO sensitivity on the basis of tripod determination/shutter speed control |
| i Macro | X | o | x | x | x | x | | Reducing color setting |
| | | | | | | | Monitor | Aperture correction gain smaller than usual |
| | | | | | | | Halfway Pressing | ISO sensitivity on the basis of tripod determination/shutter speed control |

Table 1 shows the information used in determining scenes in the automatic scene selection mode described above, the timings at which the scene selection is performed and the set contents of image processing and effects after the scene selection. As shown in Table 1, the system control unit 40 determines that the mode of the imaging device is any one of the i portrait mode, the i scenery mode, the i night scenery mode, the i night scenery & portrait mode and the i macro mode on the basis of the face information, the EV information, the information on reflection light when AF auxiliary light is emitted, the information on reflection light when the strobe 6 is pre-flashed and the information on the flash setting of the strobe 6. For example, the system control unit 40 only uses the face information when performing the portrait determination, uses the focus information and the EV information when performing the scenery determination, uses the focus information, the EV information, the AF auxiliary light reflection information and the setting information of the strobe 6 when performing the night scenery determination, uses the face information, the EV information, the pre-flash reflection information and the setting information of the strobe 6 when performing the night scenery & portrait determination, and uses the focus information when performing the macro determination. Note that the focus information is not necessary when performing the night scenery determination.

3. Effects of the Embodiment, Etc.

According to the present embodiment, due to having the automatic scene selection mode, the shooting mode suited for the scene at that time of shooting can be selected automatically. Thus, there is no need for a user to perform settings for the shooting mode, and consequently the operability can be improved. Further, according to the present embodiment, upon performing the automatic scene selection, the information used in determining a scene is changed in accordance with the conditions of a camera, in other words, the state in which the release button is operated. As a result, the reliability of the scene determination result can be enhanced.

Further, the imaging device is configured to recognize automatically in the automatic scene selection mode that the subject is a person, and a variety of settings suited for shooting the subject are performed. Thus, the settings suited for shooting a portrait such as correcting the skin color portions are performed automatically, and as a result the operability can be improved.

Further, the imaging device is configured to recognize automatically in the automatic scene selection mode that the subject is scenery, and a variety of settings suited for shooting the subject are performed. Thus, the settings suited for shooting scenery such as correcting gamma to obtain a high contrast are performed automatically, and as a result the operability can be improved.

Further, the imaging device is configured to recognize automatically in the automatic scene selection mode that the subject is night scenery, and a variety of settings suited for shooting the subject are performed. Thus, the settings suited for shooting scenery such as reducing the shutter speed and controlling the white balance are performed automatically, and as a result the operability can be improved.

Further, the imaging device is configured to recognize automatically in the automatic scene selection mode a person with night scenery as the background, and a variety of settings suited for shooting the subject and the background are performed. Thus, the settings suited for shooting night scenery and portrait such as increasing the color saturation and correcting the skin color portions are performed automatically, and as a result the operability can be improved.

Further, the imaging device is configured to recognize automatically in the automatic scene selection mode that the subject is at a close-up position, and a variety of settings suited for shooting the subject are set. Thus, the settings suited for the macro shooting such as reducing the color saturation are performed automatically, and as a result the operability can be improved.

The types of scenes determinable in the automatic scene selection mode described above are examples, and the imaging device may be configured to determine other scenes. For example, by detecting a quick movement of the subject, the mode of the imaging device may be determined as a "sports mode", and settings such as increasing the shutter speed and optimizing the image stabilization feature may be performed automatically.

Further, although the imaging device is configured to display, in the automatic scene selection mode, any of the icons shown in FIGS. 8A to 8E on the display portion 29 at the time of the scene determination, the size and color of the icon may be changed temporarily at the time of the determination. For example, each of the icons is displayed temporarily in blue and in large size at the time of the scene determination and then is displayed in red and in small size. By having such a configuration, it is possible visually to notify a user that the scene determination is performed.

Further, a beep sound may be generated at the time of the scene determination. By having such a configuration, it is possible to notify a user with a sound that the scene determination is performed.

Further, although the mode dial 9 is operated to shift the mode of the imaging device to the automatic scene selection mode in the present embodiment, the mode may be shifted by operating other operation portions, such as the cursor keys 10.

Further, the determination of the i night scenery mode and the i night scenery & portrait mode in the monitor state is not performed in the present embodiment, the determination of the i night scenery mode and the i night scenery & portrait mode may be performed even in the monitor state. For example, when determining the i night scenery mode in the monitor state, the mode may be determined on the basis of the focus information, the EV information and the flash setting of the strobe 6 (i.e., the information other than AF auxiliary light reflection information). Further, when determining the i night scenery & portrait mode in the monitor state, the mode may be determined on the basis of the face information and the EV information (i.e., the information other than information on the strobe 6).

Further, in the present embodiment, when the imaging device is an imaging device with an interchangeable lens, such as a single-lens reflex camera, the zoom lens 21, the diaphragm 22, the focus lens 23 and the motors 31 to 33 may be provided in a lens unit, and other components may be provided in a camera unit. Some of the control portions may be provided in the lens unit. The present invention does not limit the system configuration of the imaging device.

Embodiment 2

1. Configuration and Basic Operation of the Imaging Device

Figure 9:
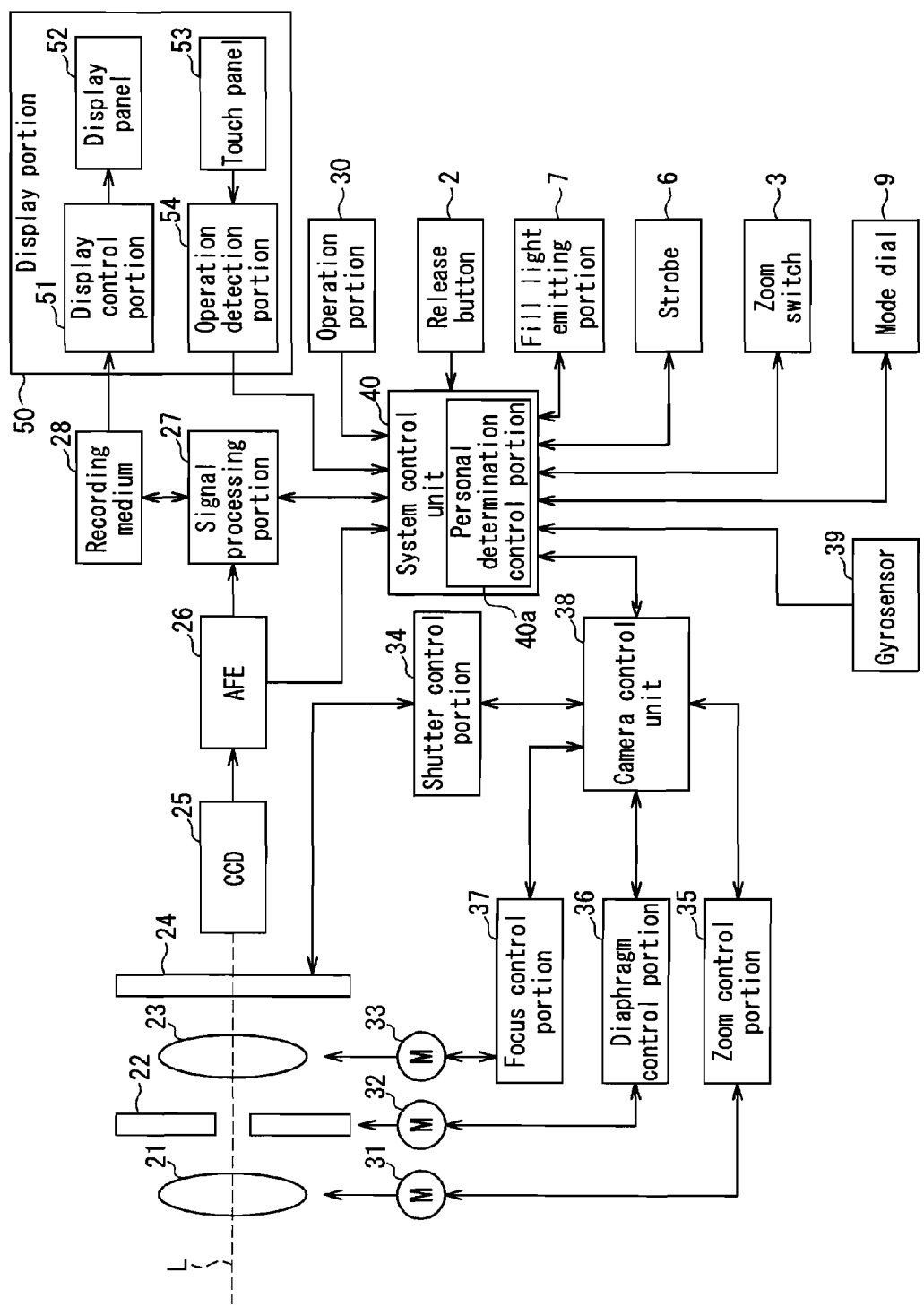
FIG. 9 is a block diagram showing a configuration of an imaging device in Embodiments 2 and 3.

FIG. 9 is a diagram showing the internal configuration of an imaging device according to the present embodiment. The configuration shown in FIG. 9 is different from the configuration shown in FIG. 4 in that a display portion 50 is provided in place of the display portion 29. Since other components are the same as those in the configuration shown in FIG. 4, the detailed description thereof will not be repeated.

The display portion 50 includes a display control portion 51, a display panel 52, a touch panel 53 and an operation detection portion 54. The display portion 50 is a so-called touch panel display.

The display control portion 51 can convert image data outputted from the signal processing portion 27 to a signal displayable on the display panel 52 (e.g., conversion to an analog image signal).

On the basis of the signal sent from the display control portion 51, the display panel 52 can display an image. Although a liquid crystal display with a size of about 1 to 3 inches is used for the display panel 52, for example, a display at least capable of displaying an image, such as an EL (Electro-Luminescence) element, may be used for the display panel 52.

The touch panel 53 is provided on the display surface of the display panel 52. By pressing the back (hereinafter referred to as an operation surface) of the surface that faces the display surface of the display panel 52 with a finger or the like, a given operation can be performed. Specifically, the touch panel 53 is provided with a matrix switch on the operation surface side, and by pressing a given position on the operation surface with a finger, a pen, etc., the matrix switch on the pressed position is turned on. By taking out the position information of the matrix switch, it is possible to detect that the given position on the touch panel 53 is pressed. As the touch panel 53, there are resistance film type, capacitance type and surface acoustic wave type touch panels. The display portion 50 may be provided with any of these touch panels. Further, the touch panel 53 is formed in such a manner that at least the portion covering the effective display area of the display panel 52 is transparent so as to allow an image displayed on the display panel 52 to be visually recognized from outside (from the operation surface side of the touch panel 53).

On the basis of the on/off state of each portion of the matrix switch on the touch panel 53, the operation detection portion 54 generates information on the pressed position (two-dimensional X-Y position information). Further, the operation detection portion 54 sends the generated position information to the system control unit 40. Note that the touch panel 53 and the operation detection portion 54 are examples of the area selector of the present invention.

The system control unit 40 is capable of controlling not only the variety of features of the imaging device 1 described in Embodiment 1 but also a variety of other features on the basis of the position information sent from the operation detection portion 54. Details of the control of the system control unit 40 will be described later.

The imaging device according to the present embodiment is configured such that when a user presses the position on the touch panel 53 corresponding to a desired position of an image that is displayed on the display panel in the monitor state, the automatic scene operation, the AF operation and the like can be performed on the pressed subject image. Hereinafter, the operation of the imaging device according to the present embodiment will be described.

2. Operation of the Automatic Scene Selection Mode

Next, the operation when the mode dial 9 is operated to select the automatic scene selection mode will be described. Automatically recognizable scenes in the automatic scene selection mode are "portrait", "scenery", "night scenery", "night scenery & portrait" and "macro". Further, when none of the scenes is recognized, the iA auto mode is set. In the automatic scene selection mode, any one of the five scenes or the iA mode is selected on the basis of an image to be captured, the focus information, etc. Since the set contents of the imaging device 1 when each of the scenes is recognized already have been described in Embodiment 1, the description thereof will not be repeated in this section.

[2-1. Operation in the Monitor State]

Figure 10:
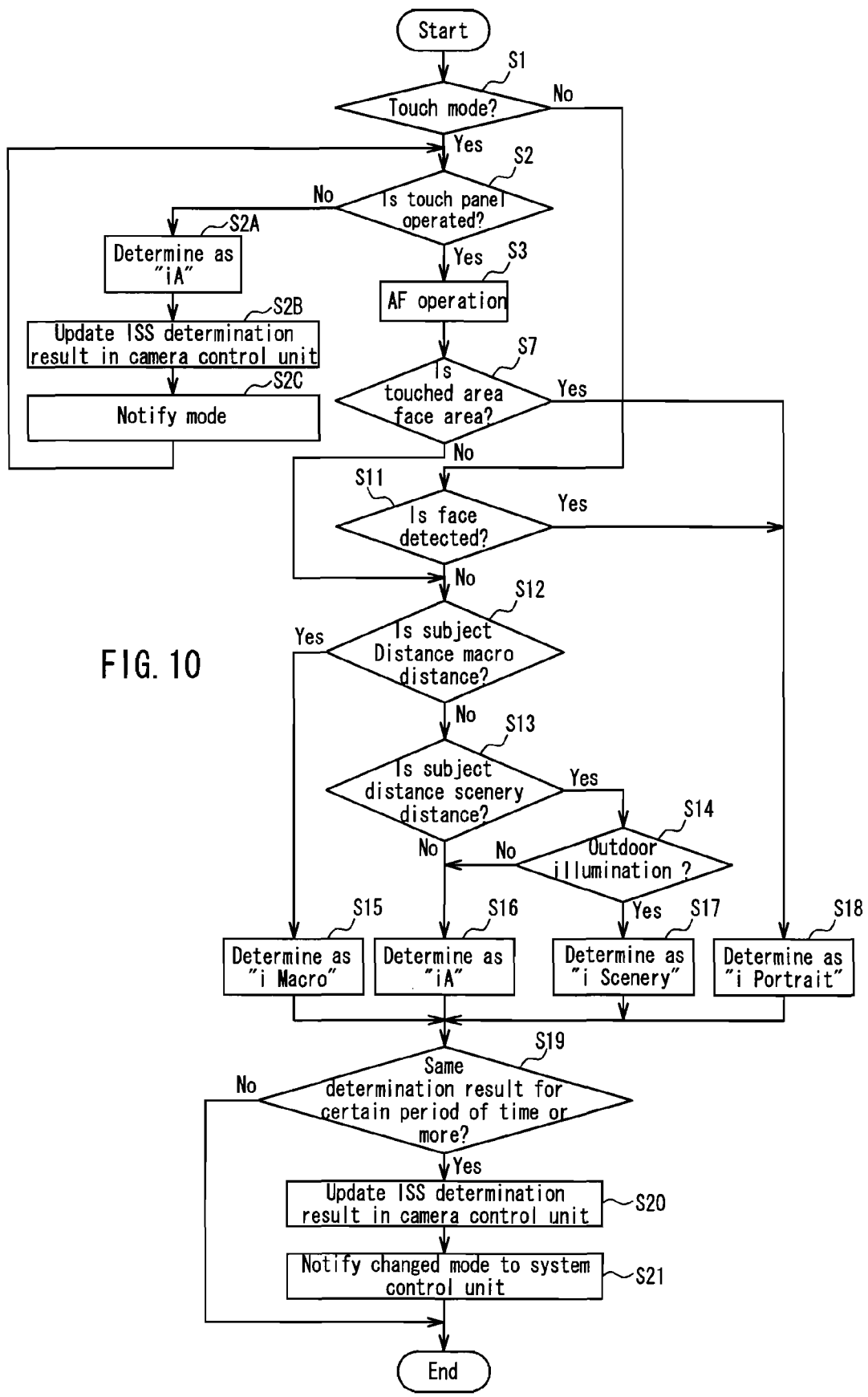
FIG. 10 is a flowchart for explaining scene discrimination operation in a monitor state.
Figure 11A:
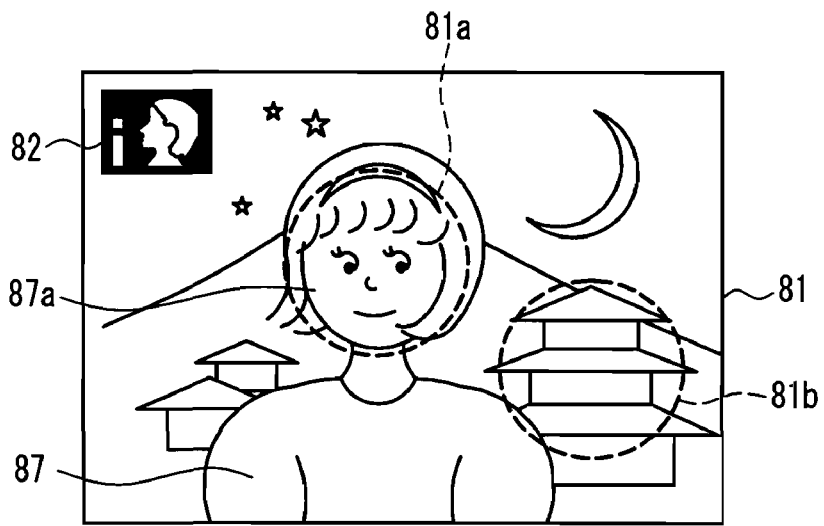
FIG. 11A is a schematic diagram showing an example image displayed at the time of area selection.
Figure 11B:
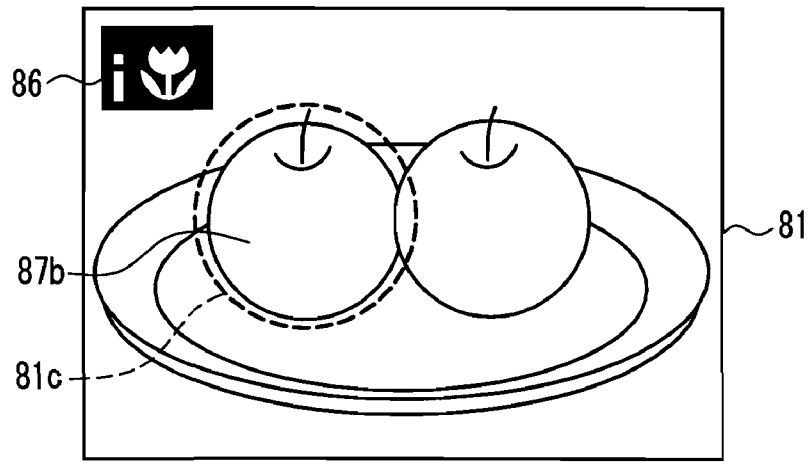
FIG. 11B is a schematic diagram showing an example image displayed at the time of area selection.

FIG. 10 is a flowchart showing the flow of the automatic scene selection operation in the monitor state. FIGS. 11A and 11B are diagrams each showing an example of an image (through image) that is displayed on the display panel 52. The image shown in FIG. 11A contains a person and scenery. The image shown in FIG. 11B is displayed on the display panel 52 when the subject is shot from a close-up range.

First, when the mode dial 9 is operated to select the automatic scene selection mode, the system control unit 40 controls the camera control unit 38 to set each of the focus setting, the aperture setting, the white balance setting, etc. to an initial value. Note that the initial value used herein refers to the setting value of each component when the automatic scene recognition is not performed.

Note that the way to select the automatic scene selection mode is not limited to operating the mode dial 9. For example, by providing the imaging device 1 with a mode button, and displaying a list of selectable modes on the display panel 52 when the mode button is operated, a user can select a desired mode from the displayed mode list. A user may operate the cursor keys 10 or press the touch panel 53 to select the desired mode from the mode list.

Next, the system control unit 40 determines whether a touch mode is enabled or not. When the touch mode is enabled, the system control unit 40 performs step S2. On the other hand, when the touch mode is disabled, the system control unit 40 performs step S11 and thereafter, the system control unit 40 starts the automatic scene selection operation described in Embodiment 1 (S1).

Note that the touch mode refers to a mode in which predetermined processing (AF operation, etc.) can be performed by a user pressing the touch panel 53. In the present embodiment, a user can select freely between the touch mode and a normal mode in which the predetermined processing (AF operation, etc.) cannot be performed through the touch panel 53. To enable the touch mode, for example, a predetermined icon may be displayed on the display panel 52 and a user may press the icon on the touch panel 53. Or, the touch mode can be enabled when the mode dial 9 is operated to select the automatic scene selection mode.

Next, on the basis of a signal outputted from the operation detection portion 54, the system control unit 40 monitors whether or not the touch panel 53 is pressed (S2).

When the touch panel 53 is pressed, the operation detection portion 54 sends the information on the pressed position on the touch panel 53 to the system control unit 40. When it is detected, on the basis of the signal sent from the operation detection portion 54, that a given subject image in the image displayed on the display panel 52 is pressed through the touch panel 53, the system control unit 40 instructs the camera control unit 38 to perform AF operation on the subject image. On the basis of the instruction given by the system control unit 40, the camera control unit 38 sends an instruction to the focus control portion 37 to perform AF operation. The AF operation is operated such that, on the basis of the instruction given by the camera control unit 38, the focus control portion 37 operates the focus motor 33 to move the focus lens 23 in the optical axis direction so as to bring the optical image of the designated subject into focus on the imaging surface of the CCD 25 (S3).

For example, in the displayed image shown in FIG. 11A, when the position on the touch panel 53 corresponding to an image area 81a including a face 87a of a person 87 is pressed, AF operation is performed to bring the optical image of the face 87a into focus on the imaging surface of the CCD 25. Similarly, when the position on the touch panel 53 corresponding to an area 81b is pressed, AF operation is performed to bring the optical image of the building as part of the scenery into focus on the imaging surface of the CCD 25. Also similarly, in the displayed image shown in FIG. 11B, when the position on the touch panel 53 corresponding to an area 81c is pressed, AF operation is performed to bring the optical image of a subject 87b into focus on the imaging surface of the CCD 25. In this way, when a user presses the position on the touch panel 53 corresponding to a given position of the image that is displayed on the display panel 52, the system control unit 40 controls so that AF operation is performed on the subject image of the pressed area.

In contrast, when it is detected at step S2 that the touch panel 53 is not pressed, the system control unit 40 determines that the mode of the imaging device 1 is the iA mode (S2A). Next, the system control unit 40 updates the information of the ISS determination result held in the camera control unit 38 (S2B). The camera control unit 38 controls each control portion so that the settings of the imaging system and image processing are performed on the basis of the updated ISS determination result. Then, the camera control unit 38 notifies the system control unit 40 that the information of the ISS determination result is updated (S2C). In other words, the system control unit 40 always sets the iA mode while the touch panel 53 is not pressed by a user, and when the touch panel 53 is pressed, the system control unit 40 controls so that AF operation and the automatic scene selection operation are performed. The imaging device may be configured so that the mode is not fixed to the iA mode and the scene determination process is performed before the touch panel 53 is pressed.

In the present embodiment, after the touch mode is enabled, the system control unit 40 always sets the iA mode while the touch panel 53 is not pressed. However, as described in Embodiment 1, shooting scene discrimination may be performed while the touch panel 53 is not pressed.

Further, although it has been described in the present embodiment that AF operation is performed when the touch panel 53 is pressed, AF operation may not be performed.

Next, on the basis of the image data of the through image outputted from the signal processing portion 27 and the position information on the touch panel 53 sent from the operation detection portion 54, the system control unit 40 specifies the area of the through image pressed through the touch panel 53. In other words, the system control unit 40 specifies the area of the subject image on which AF operation was performed at step S3. Subsequently, the system control unit 40 recognizes the subject image in the pressed area, and determines whether or not a person's face is included in the subject image (S7).

When it is determined at step S7 that a face is included in the subject image in the pressed area (when the area 81a is pressed through the touch panel 53), the system control unit 40 sets the i portrait mode (S18). At this time, the system control unit 40 only performs the face recognition, and does not yet perform the image processing or make changes to a variety of settings conforming to the i portrait mode.

When it is determined at step S7 that a face is absent in the pressed area, the system control unit 40 then determines the subject distance on the basis of the positional relationship between the zoom lens 21 and the focus lens 23 (S12). At this time, the subject distance is determined as one of the following: the "macro distance" as the shortest distance; the "scenery distance" as the longest distance; the "normal distance" as an intermediate distance between the macro and scenery distances; and "unknown" where the subject distance is unmeasurable. It is assumed that there are other determinable subject distances in the present embodiment in addition to those mentioned above.

Further, in the present embodiment, threshold values for determining the "macro distance", the "scenery distance" and the "normal distance" are variable in accordance with zoom magnification. The reasons for adopting variable threshold values for determining the distances are as follows. The size of the major subject in a shot image (proportion of the size of the major subject to the angle of view) at the wide-angle end and that at the telephoto end become almost the same when "the subject distance at the wide-angle end is 10 cm and the subject distance at the telephoto end is 1.5 m". Although the subject distance to be determined as the macro distance (actual distance) at the wide-angle end and that at the telephoto end are completely different from each other, they (macro distance, etc.) become the same when the angle of view is similar. Therefore, by allowing threshold values for determining the subject distance to be variable in accordance with zoom magnification, it is possible to bring the angle of view determined as the macro distance at the wide-angle end and that at the telephoto end into conformity with each other by changing zoom magnification.

When the subject distance is determined as the macro distance (Yes at step S12), the system control unit 40 sets the i macro mode (S15). At this time, the system control unit 40 only performs the macro recognition, and does not yet perform the image processing or make changes to a variety of settings conforming to the i macro mode.

Further, when the subject distance is determined as the scenery distance (Yes at S13), the system control unit 40 determines whether the shooting is taking place in the outdoors or not on the basis of the illumination in the shooting environment (S14). Specifically, an EV value as brightness information is calculated, and on the basis of the size of the EV value, whether the illumination corresponds to the "low illumination", the "normal illumination" or the "outdoor illumination" is determined. It is assumed that there are other kinds of determinable illumination in the present embodiment in addition to those mentioned above.

When the illumination is determined as the outdoor illumination (outdoor shooting) at step S14, the system control unit 40 sets the i scenery mode (S17). At this time, the system control unit 40 only performs the scenery recognition, and does not yet perform the image processing or make changes to a variety of settings conforming to the i scenery mode.

Further, when the illumination is not determined as the outdoor illumination at step S14, the system control unit 40 sets the iA mode (S16).

The system control unit 40 performs steps S7 to S18 at a predetermined time interval.

Next, the system control unit 40 determines whether or not the determined result at any one of steps S15 to S18 has lasted for a certain period of time (e.g., 10 VD, 1 VD=1/30 sec.) (S19). In the present embodiment, when the determined result is the i portrait mode (S18), it is possible to set the certain period of time longer than that used in determining the determined result other than the i portrait mode. For example, the certain period of time is set to two to three seconds (60 to 90 VD). By setting the period in this way, even when a person is present in the angle of view but the person's face cannot be recognized for a little while (e.g., when the person is not facing the imaging device 1 head on), it is possible to maintain the determined result.

When it is determined as a result of step S19 that one mode has lasted for the certain period of time (e.g., 10 VD) or more, the system control unit 40 updates the information of the ISS (Intelligent Scene Selector) determination result held in the camera control unit 38 (S20). The camera control unit 38 controls each control portion so that the settings of the imaging system and image processing are performed on the basis of the updated ISS determination result.

Next, the camera control unit 38 notifies the system control unit 40 that the information of the ISS determination result is updated (S21).

Then, the system control unit 40 generates image data of an OSD (On Screen Display) icon that is to be superimposed on an image displayed on the display portion 29. The signal processing portion 27 superimposes the OSD image data generated by the system control unit 40 on image data outputted from the AFE 26, and outputs the superimposed image data to the display portion 29. The display portion 29 displays an image on the basis of the image data outputted from the signal processing portion 27.

As described above, by enabling the touch mode when the imaging device 1 is in the monitor state, and pressing the position on the touch panel 53 corresponding to a given area of the image displayed on the display panel 52, not only that AF operation is performed on the image in the pressed area but also the mode of the imaging device 1 is determined as any one of the i portrait mode, the i scenery mode, the i macro mode and the iA mode on the basis of the conditions of the optical system such as the condition of the zoom lens 21. And on the basis of the determination result, the settings of the imaging system, etc. in the imaging device 1 are changed automatically. By having such a configuration, there is no need for a user to select the shooting mode suited for the shooting scene, and consequently the operability can be improved.

Further, the display portion 50 is provided with the touch panel 53, so that a given area of an image that is displayed on the display panel 52 can be designated easily, and as a result, the operability can be improved. For example, since the subject in an image displayed on the display panel 52 that a user wishes to bring into focus can be selected by operating the touch panel 53, there is no need to change the angle of view to bring the subject that a user wishes to bring into focus into the center of the displayed image as in the conventional imaging device. Therefore, it is possible to perform AF operation promptly and easily.

[2-2. Operation at the Time of Operating the Release Button]

The operation at the time of operating the release button 2 when the imaging device 1 is in the automatic scene selection mode will be described. The types of operations performable on the release button 2 include the "halfway pressing operation" in which the release button 2 is pressed about a half of the entire stroke and the "full pressing operation" in which the release button 2 is pressed the entire stroke. Generally, the imaging device performs AF operation when the release button 2 is pressed halfway and shooting can be performed when the release button 2 is pressed fully from the state of being pressed halfway. In the following, the operation when the release button 2 is pressed halfway will be described as an example.

Figure 12A:
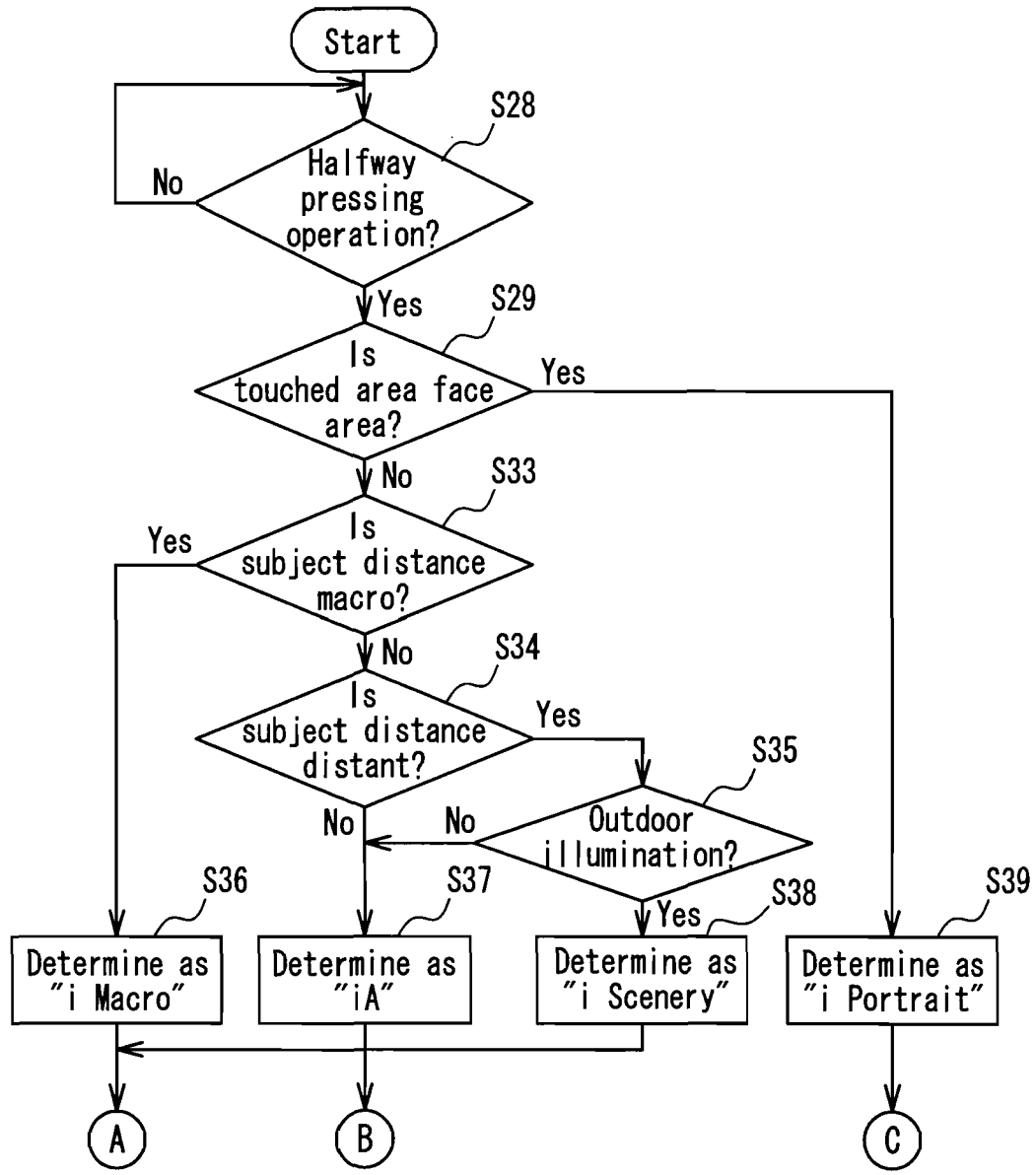
FIG. 12A is a flowchart for explaining the operation at the time of operating a release button.
Figure 12B:
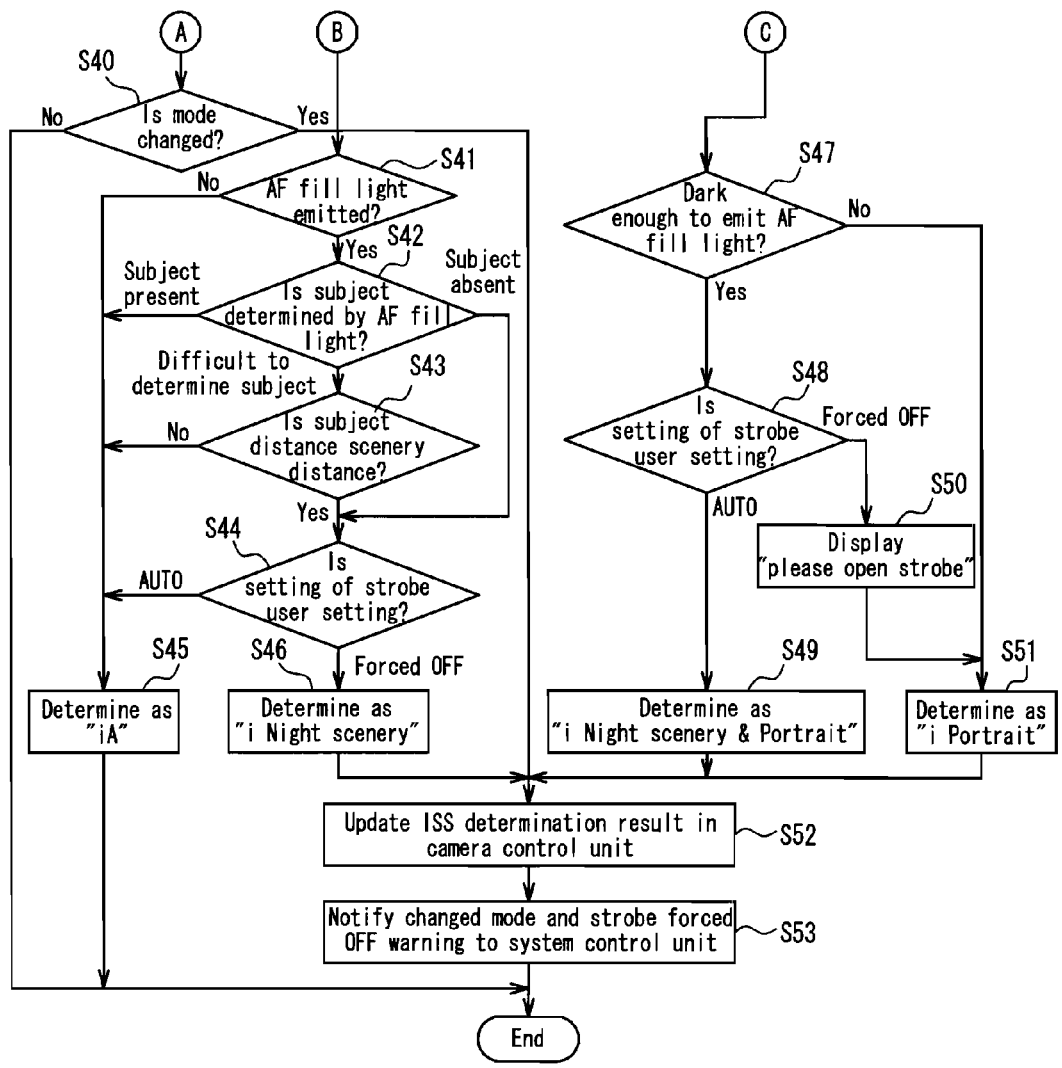
FIG. 12B is a flowchart for explaining the operation at the time of operating the release button.

FIGS. 12A and 12B are flowcharts each showing the flow when the release button 2 is operated in the automatic scene selection mode. Note that the flow in FIG. 12A is linked to the flow in FIG. 12B through the portions A, B and C.

First, when the release button 2 is pressed halfway at the time the imaging device 1 is in the monitor state (the state in which the flow shown in FIG. 10 ended) (S28), the system control unit 40 reads image data from the signal processing portion 27. Next, the personal determination control portion 40a determines whether or not a person's face is present in the area of the image specified by a user at step S2 in FIG. 10 (S29). When the personal determination control portion 40a determines that a person's face is present in the image, the system control unit 40 sets the i portrait mode (S39). At this time, the system control unit 40 only performs the personal recognition, and does not yet perform the image processing or make changes to a variety of settings conforming to the i portrait mode.

Further, when a person's face is not recognized at the personal determination control portion 40a (No at S29), the system control unit 40 then determines the subject distance on the basis of the positional relationship between the zoom lens 21 and the focus lens 23 (S33). At this time, the subject distance is determined as one of the following: the "macro distance" as the shortest distance; the "scenery distance" as the longest distance; the "normal distance" as an intermediate distance between the macro and scenery distances; and "unknown" where the subject distance is unmeasurable. When the subject distance is determined as the macro distance, the system control unit 40 sets the i macro mode (S36). At this time, the system control unit 40 only performs the macro recognition, and does not yet perform the image processing or make changes to a variety of settings conforming to the i macro mode.

Further, when the subject distance is determined as the scenery distance (Yes at S34), the system control unit 40 determines whether the shooting is taking place in outdoors or not on the basis of the illumination in the shooting environment (S35). Specifically, an EV value as brightness information is calculated, and on the basis of the size of the EV value, the illumination is determined as any one of the "low illumination", the "normal illumination" and the "outdoor illumination".

When the illumination is determined as the outdoor illumination (outdoor shooting) as at step S35, the system control unit 40 sets the i scenery mode (S38). At this time, the system control unit 40 only performs the scenery recognition, and does not yet perform the image processing or make changes to a variety of settings conforming to the i scenery mode.

Further, when the illumination is not determined as the outdoor illumination as a result of step S35, the system control unit 40 sets the iA mode (S37).

The scene determination process indicated by steps S32 to S39 is performed only once when the release button 2 is pressed halfway.

Since the details of steps S40 to S53 that are performed thereafter are similar to those described in Embodiment 1, the description of each of the steps will not be repeated in this section.

As described above, when the release button 2 is operated (pressed halfway or pressed fully) at the time the imaging device 1 is in the automatic scene selection mode, the mode of the imaging device 1 is determined as any one of the i portrait mode, the i scenery mode, the i night scenery mode, the i night scenery & portrait mode, the i macro mode and the iA mode on the basis of the conditions of the optical system such as the condition of the zoom lens 21. And on the basis of the determination result, the settings of the imaging system, etc. in the imaging device 1 are changed automatically. By having such a configuration, there is no need for a user to select the shooting mode suited for the shooting scene, and consequently the operability can be improved.

Although the process flow when the release button 2 is pressed halfway has been described above, a similar process is performed even when the release button 2 is pressed fully.

3. Effects of the Embodiment, Etc.

According to the present embodiment, the imaging device includes the display portion 50 provided with the touch panel 53. By a user pressing an area of the touch panel 53 corresponding to a given area in an image displayed on the display panel 52, not only is AF operation performed on the image included in the pressed area but also the image in the pressed area is recognized automatically to determined that the mode of the imaging device 1 is any one of the i portrait mode, the i scenery mode, the i macro mode and the iA mode. And on the basis of the determination result, the settings of the imaging system, etc. in the imaging device 1 are changed automatically. By having such a configuration, there is no need for a user to select the shooting mode suited for the shooting scene, and consequently the operability can be improved.

Further, since it is possible to select the subject image to be the target of AF operation and the automatic scene selection by operating the touch panel 53, a user easily and promptly can select the subject image to which the user wants to perform AF operation and the automatic scene selection no matter where the subject image is in the image. As a result, it is possible to improve the operability.

In the present embodiment, the display portion 50 is provided with the touch panel 53 and a given portion of a subject image that is displayed on the display panel 52 can be selected by pressing the touch panel 53. However, the operation for selecting a given portion of the subject image is not limited to pressing the touch panel 53. For example, the subject image may be selected by displaying a cursor on the image displayed on the display panel 52, moving the cursor to the position corresponding to the given subject image with the use of the cursor keys 10, and operating the button 11.

Since the operation at the time of recording in the present embodiment is substantially the same as that described in the section [2-3. Operation at the time of recording] in Embodiment 1, the description thereof will not be repeated.

Embodiment 3

1. Configuration and Basic Operation of the Imaging Device

Since the internal configuration of an imaging device according to the present embodiment is similar to that shown in FIG. 9, the description thereof will not be repeated. Further, since the operation in the automatic scene selection mode is substantially the same as that described in [2. Operation in the automatic scene selection mode] in Embodiment 1, etc., the description thereof will not be repeated.

The imaging device according to the present embodiment includes the display portion 50 provided with the touch panel 53. By a user pressing a given position on the subject displayed on the display panel 52 during the shooting, the automatic scene selection operation, AF operation, etc., can be performed on the displayed subject image at the pressed position. Furthermore, the imaging device has a feature of tracking the subject image selected by a user pressing the touch panel 53. Hereinafter, the operation of the imaging device according to the present embodiment will be described.

2. Operation in the Automatic Scene Selection Mode

[2-1. Operation in the Monitor State]

Figure 13A:
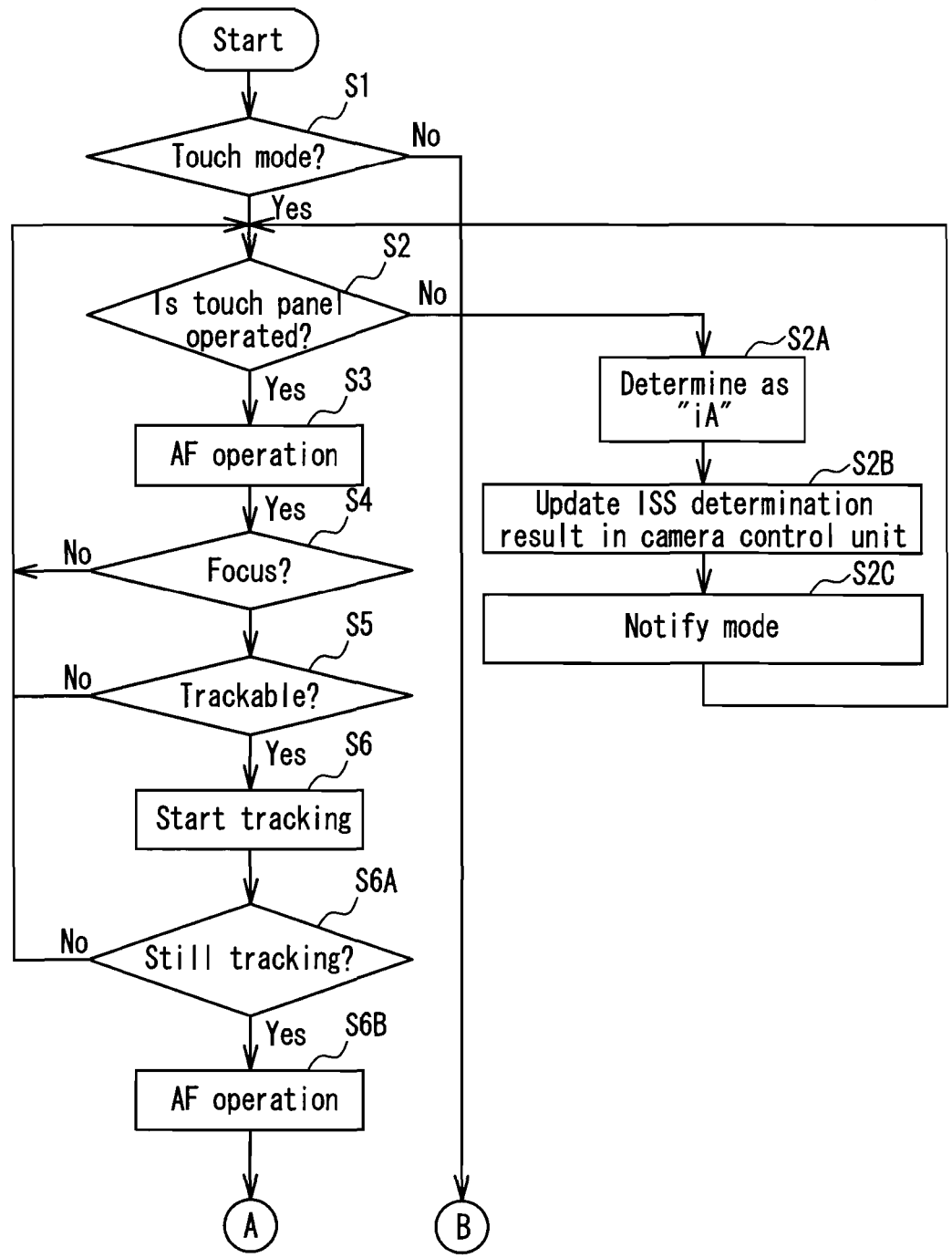
FIG. 13A is a flowchart for explaining scene discrimination operation in the monitor state.
Figure 13B:
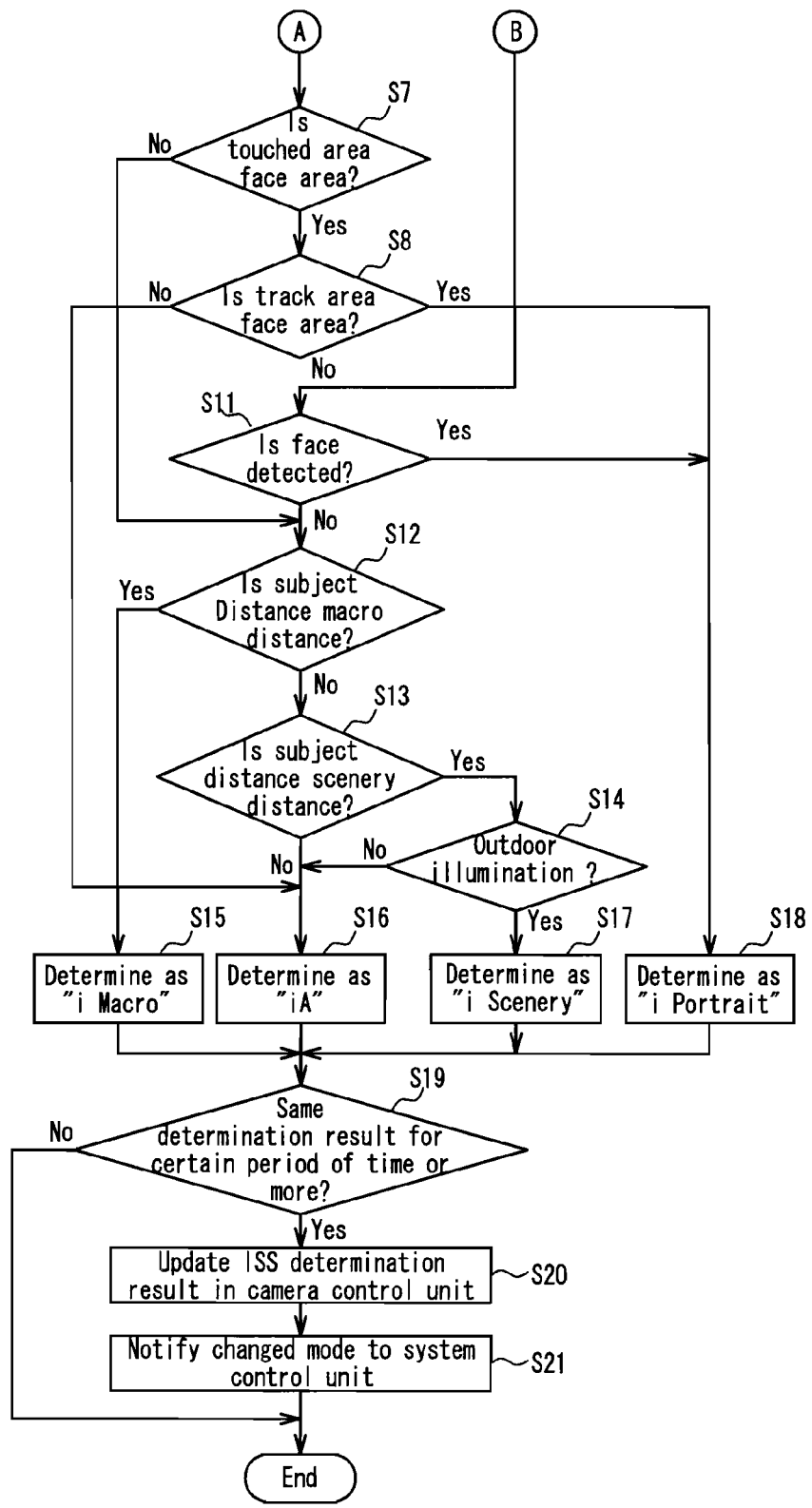
FIG. 13B is a flowchart for explaining scene discrimination operation in the monitor state.
Figure 14A:
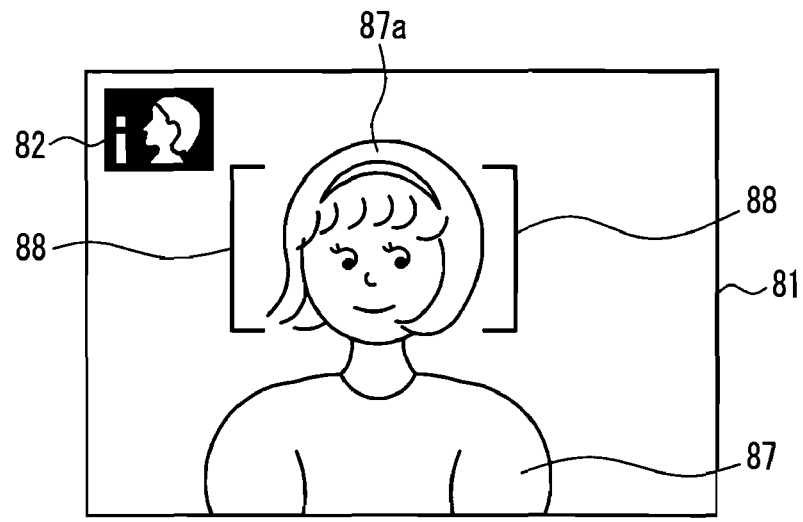
FIG. 14A is a schematic diagram showing an example image displayed in a state in which the subject image is tracked.
Figure 14B:
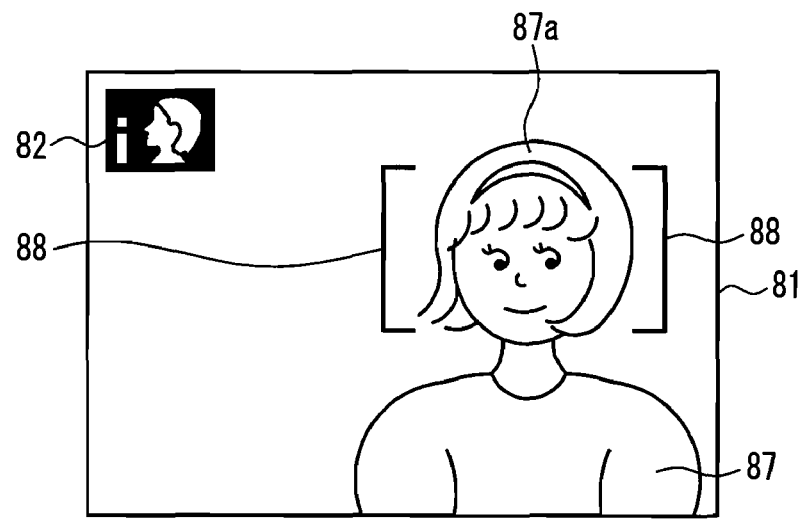
FIG. 14B is a schematic diagram showing an example image displayed in a state in which the subject image is tracked.

FIGS. 13A and 13B are flowcharts each showing the flow of the automatic scene selection operation when the imaging device is in the monitor state. Note that the flow in FIG. 13A is linked to the flow in FIG. 13B through the portions A, B and C. FIGS. 14A and 14B are diagrams each showing an example of an image (through image) displayed on the display panel 52. Each of the diagrams shows an image at the time of portrait shooting.

First, when the mode dial 9 is operated to select the automatic scene selection mode, the system control unit 40 controls the camera control unit 38 to set each of the focus setting, the aperture setting, the white balance setting, etc. to an initial value. Note that the initial value used herein refers to the setting value of each component when the automatic scene recognition is not performed.

Next, the system control unit 40 determines whether the touch mode is enabled or not. When the touch mode is enabled, the system control unit 40 performs step S2. On the other hand, when the touch mode is disabled, the system control unit 40 performs step S11 and thereafter, the system control unit 40 starts the automatic scene selection operation described in Embodiment 1 (S1).

Next, on the basis of a signal sent from the operation detection portion 54, the system control unit 40 monitors whether or not the touch panel 53 is pressed (S2).

When the touch panel 53 is pressed by a user, the operation detection portion 54 sends the information on the pressed position on the touch panel 53 to the system control unit 40. When it is detected, on the basis of the signal sent from the operation detection portion 54, that a given subject image in the image displayed on the display panel 52 is pressed through the touch panel 53, the system control unit 40 instructs the camera control unit 38 to perform AF operation on the subject image. On the basis of the instruction given by the system control unit 40, the camera control unit 38 sends an instruction to the focus control portion 37 to perform AF operation. The AF operation is operated such that, on the basis of the instruction given by the camera control unit 38, the focus control portion 37 operates the focus motor 33 to move the focus lens 23 in the optical axis direction so as to bring the optical image of the designated subject into focus on the imaging surface of the CCD 25 (S3).

In contrast, when it is detected at step S2 that the touch panel 53 is not pressed, the system control unit 40 determines that the mode of the imaging device 1 is the iA mode (S2A). Next, the system control unit 40 updates the information of the ISS determination result held in the camera control unit 38 (S2B). The camera control unit 38 controls each control portion so that the settings of the imaging system and image processing are performed on the basis of the updated ISS determination result. Then, the camera control unit 38 notifies the system control unit 40 that the information of the ISS determination result is updated (S2C). In other words, the system control unit 40 always sets the iA mode while the touch panel 53 is not pressed by a user, and when the touch panel 53 is pressed, the system control unit 40 controls so that AF operation and the automatic scene selection operation are performed. The imaging device may be configured so that the mode is not fixed to the iA mode and the scene determination process is performed before the touch panel 53 is pressed.

In the present embodiment, after the touch mode is enabled, the system control unit 40 always sets the iA mode while the touch panel 53 is not pressed. However, as described in Embodiment 1, normal shooting scene discrimination may be performed while the touch panel 53 is not pressed.

Further, although it has been described in the present embodiment that AF operation is performed when the touch panel 53 is pressed, AF operation may not be performed.

Then, the system control unit 40 obtains the image data from the signal processing portion 27 and determines the focus state on the basis of the level of high frequency components in the image data. When the state has not yet reached the focus state, the process returns to step S2. On the other hand, when the state is determined as the focus state, the system control unit 40 performs step S5 (S4).

Next, on the basis of the color information of the image data obtained from the signal processing portion 27, the system control unit 40 determines whether or not tracking control can be performed (S5). When the color information is small (e.g., when the subject is mostly composed of white), the system control unit 40 determines that it is difficult to perform the tracking control, and the process returns to step S2. On the other hand, when the subject contains enough color information, the system control unit 40 determines that the tracking control can be performed and starts the tracking control (S6). Although the tracking control is performed on the basis of the color information in the present embodiment, characteristic information of the subject, such as the shape, brightness and contrast of the subject, may be used in the tracking control.

Here, the tracking control refers to control for performing, after a given subject image displayed on the display panel 52 is selected, AF operation and the scene selection operation continuously or intermittently on the selected subject image. For example, as shown in FIG. 14A, when a user presses the position on the touch panel 53 corresponding to the face 87*a* of the person 87 who is positioned substantially at the center of the display panel 52, not only that AF operation and the scene selection operation are performed on the face 87*a* but also a frame 88 is displayed in the vicinity of the face 87*a* so as to indicate that the face 87*a* is the target of the tracking control. Thereafter, the position of the face 87*a* is monitored continuously or intermittently. Thus, even when the person 87 moves to the right side of the angle of view as shown in FIG. 14B, the frame 88 moves to the position of the face 87*a* after the movement.

Subsequently, the system control unit 40 determines whether or not the tracking control is still continuing (S6A). When the tracking control is still continuing, AF operation is performed continuously or intermittently (S6B).

Next, on the basis of the image data of the through image outputted from the signal processing portion 27 and the position information on the touch panel 53 outputted from the operation detection portion 54, the system control unit 40 specifies the area of the image based on the image data pressed through the touch panel 53. Subsequently, the system control unit 40 recognizes the image in the pressed area, and determines whether a person's face is present or not in the area (S7).

When it is determined at step S7 that a face is present in the pressed area, the system control unit 40 performs step S8. On the other hand, when it is determined at step S7 that a face is absent in the pressed area, the system control unit 40 performs step S12.

When it is determined that a face is present in the pressed area, the system control unit 40 determines whether a person's face is present or not in the area of the image on which the tracking control is performed (the area surrounded by the frame 88 in FIG. 14A, etc.) (S8). When it is determined that a face is present in the area on which the tracking control is performed, the system control unit 40 sets the i portrait mode (S18). At this time, the system control unit 40 only performs the face recognition, and does not yet perform the image processing or make changes to a variety of settings conforming to the i portrait mode. On the other hand, when it is determined that a face is absent in the area on which the tracking control is performed, the system control unit 40 sets the iA mode (S16). Further, in the present embodiment, whether a person's face is present or not in the area on which the tracking control is performed may not be determined. In this case, the i portrait mode may be set when it is determined at step S8 that a face is present at somewhere in the through image (S18).

Further, when the area in which the personal determination control portion 40*a* performs face detection and the target area (the frame 88) of the tracking control become inconsistent and this state lasts for a certain period of time (e.g., three sec.) or more, the system control unit 40 sets the iA mode. In other words, by the personal determination control portion 40*a* not detecting a face or stopping the tracking control when other person's face is detected, it is possible to only track the face initially selected by the user and to prevent the target of the tracking control from being switched to scenery from the face. Further, by preventing the face being tracked from going out of the angle of view, the system control unit 40 determines again that the mode of the imaging device 1 is the i portrait mode when the area in which the personal determination control portion 40*a* performs face detection and the target area of the tracking control coincide. Whether or not the face detection area and the tracking area coincide may not be determined. In that case, step S8 becomes unnecessary, and when a face is detected, the mode of the imaging device 1 is determined as the i portrait mode.

Further, when it is determined at step S7 that a face is absent in the pressed area, the system control unit 40 then determines the subject distance on the basis of the positional relationship between the zoom lens 21 and the focus lens 23 (S12). At this time, the subject distance is determined as one of the following: the "macro distance" as the shortest distance; the "scenery distance" as the longest distance; the "normal distance" as an intermediate distance between the macro and scenery distances; and "unknown" where the subject distance is unmeasurable. It is assumed that there are other determinable subject distances in the present embodiment in addition to those mentioned above.

Further, in the present embodiment, threshold values for determining the "macro distance", the "scenery distance" and the "normal distance" are variable in accordance with the zoom magnification. The reasons for adopting variable threshold values for determining the distances are as follows. The size of the major subject in a shot image (proportion of the size of the major subject to the angle of view) at the wide-angle end and that at the telephoto end become almost the same when "the subject distance at the wide-angle end is 10 cm and the subject distance at the telephoto end is 1.5 m". Although the subject distance to be determined as the macro distance (actual distance) at the wide-angle end and that at the telephoto end are completely different from each other, they (macro distance, etc.) become the same when the angle of view is similar. Therefore, by allowing threshold values for determining the subject distance to be variable in accordance with the zoom magnification, it is possible to bring the angle of view determined as the macro distance at the wide-angle end and that at the telephoto end into conformity with each other by changing the zoom magnification.

When the subject distance is determined as the macro distance (Yes at step S12), the system control unit 40 sets the i macro mode (S15). At this time, the system control unit 40 only performs the macro recognition, and does not yet perform the image processing or make changes to a variety of settings conforming to the i macro mode.

Further, when the subject distance is determined as the scenery distance (Yes at S13), the system control unit 40 determines whether the shooting is taking place in outdoors or not on the basis of the illumination in the shooting environment (S14). Specifically, an EV value as brightness information is calculated, and on the basis of the size of the EV value, whether the illumination corresponds to the "low illumination", the "normal illumination" or the "outdoor illumination" is determined. It is assumed that there are other kinds of determinable illumination in the present embodiment in addition to those mentioned above.

When the illumination is determined as the outdoor illumination (outdoor shooting) at step S14, the system control unit 40 sets the i scenery mode (S17). At this time, the system control unit 40 only performs the scenery recognition, and does not yet perform the image processing or make changes to a variety of settings conforming to the i scenery mode.

Further, when the illumination is not determined as the outdoor illumination at step S14, the system control unit 40 sets the iA mode (S16).

When the face 87*a* as the target of the tracking control goes out of the angle of view or the tracking becomes impossible when the subject as the target of the tracking control moves too fast (No at 56A), the tracking control is stopped and the process returns to step S2. In the present embodiment, even when the face 87*a* reenters into the angle of view, the system control unit 40 does not resume the tracking control on the face 87*a* unless the area on the touch panel 53 corresponding to the face 87*a* is pressed by the user again. However, when the face 87*a* reenters into the angle of view, the face 87*a* may be detected by the personal determination control portion 40*a* and the tracking control may be resumed. In the present embodiment, although the tracking control is stopped and the iA mode is set (S2A) when the tracking control becomes impossible (No at S6A), for example, shooting scene discrimination may be performed as described in Embodiment 1.

Although the target of the tracking control in the above description is a person's face, the tracking control can be performed even when the target is a subject other than a face. In other words, when the scenery area of the through image is pressed by the user at step S2, AF control and the tracking control are performed on the scenery. Further, when the subject (e.g., scenery) as the tracking target goes out of the angle of view of the through image and the tracking control becomes impossible, the iA mode is set. In other words, even when the tracking target is other than a person, the tracking control is performed in a manner similar to that in tracking a person.

The system control unit 40 performs steps S7 to S18 at a predetermined time interval.

Further, when the system control unit 40 redetects that the touch panel 53 is pressed, the process may return to step S3.

When it is detected at step S7 that the area other than the face area is pressed by the user, the system control unit 40 controls not to shift the mode of the imaging device 1 to the i portrait mode even if the area in which the personal determination control portion 40*a* performs face detection and the target area of the tracking control coincide. Whether or not the face detection area and the tracking area coincide may not be determined.

Since the details of steps S19 to S21 that are performed thereafter are similar to those described in Embodiment 1, the description of each of the steps will not be repeated in this section.

As described above, by enabling the touch mode, and pressing the position on the touch panel 53 corresponding to a given area of the image displayed on the display panel 52, not only is AF operation performed on the image in the pressed area while tracking the image but also the image being tracked is determined as any one of the i portrait mode, the i scenery mode, the i macro mode and the iA mode on the basis of the EV value and the conditions of the optical system such as the condition of the zoom lens 21. And on the basis of the determination result, the settings of the imaging system, etc. in the imaging device 1 are changed automatically. By having such a configuration, there is no need for a user to select the shooting mode suited for the shooting scene, and consequently the operability can be improved.

Further, the display portion 50 is provided with the touch panel 53, so that a given area of an image that is displayed on the display panel 52 easily can be designated, and as a result, the operability can be improved. For example, since the subject image in an image displayed on the display panel 52 to be the target of AF operation and the tracking control can be selected by operating the touch panel 53, there is no need to change the angle of view to bring the subject image into the center of the displayed image as in the conventional imaging device. Therefore, it is possible to specify the subject image promptly and easily.

[2-2. Operation at the Time of Operating the Release Button]

The operation at the time of operating the release button 2 when the imaging device 1 is in the automatic scene selection mode will be described. The types of operations performable on the release button 2 include the "halfway pressing operation" in which the release button 2 is pressed about a half of the entire stroke and the "full pressing operation" in which the release button 2 is pressed the entire stroke. Generally, the imaging device performs AF operation when the release button 2 is pressed halfway and shooting can be performed when the release button 2 is pressed fully from the state of being pressed halfway. In the following, the operation when the release button 2 is pressed halfway will be described as an example.

Figure 15A:
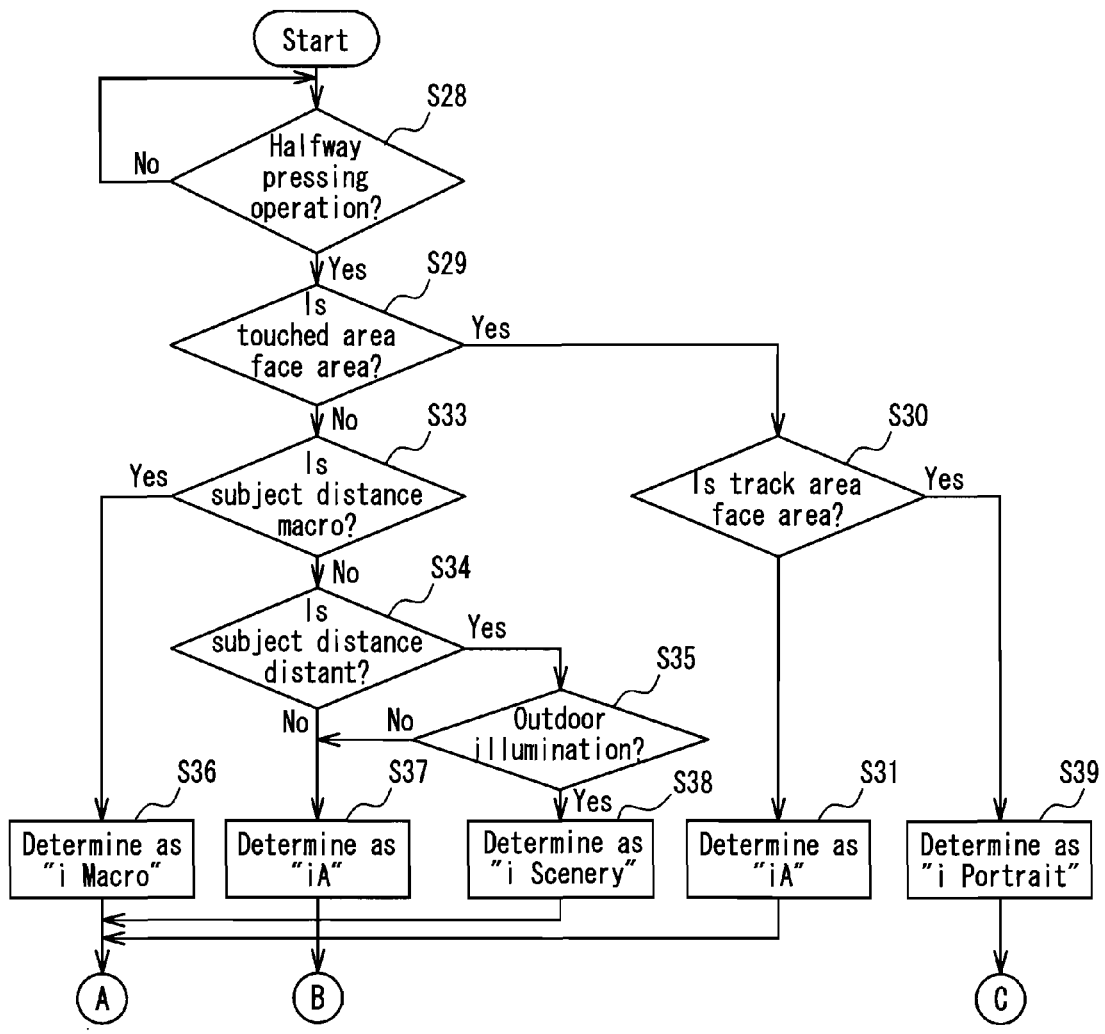
FIG. 15A is a flowchart for explaining the operation at the time of operating the release button.
Figure 15B:
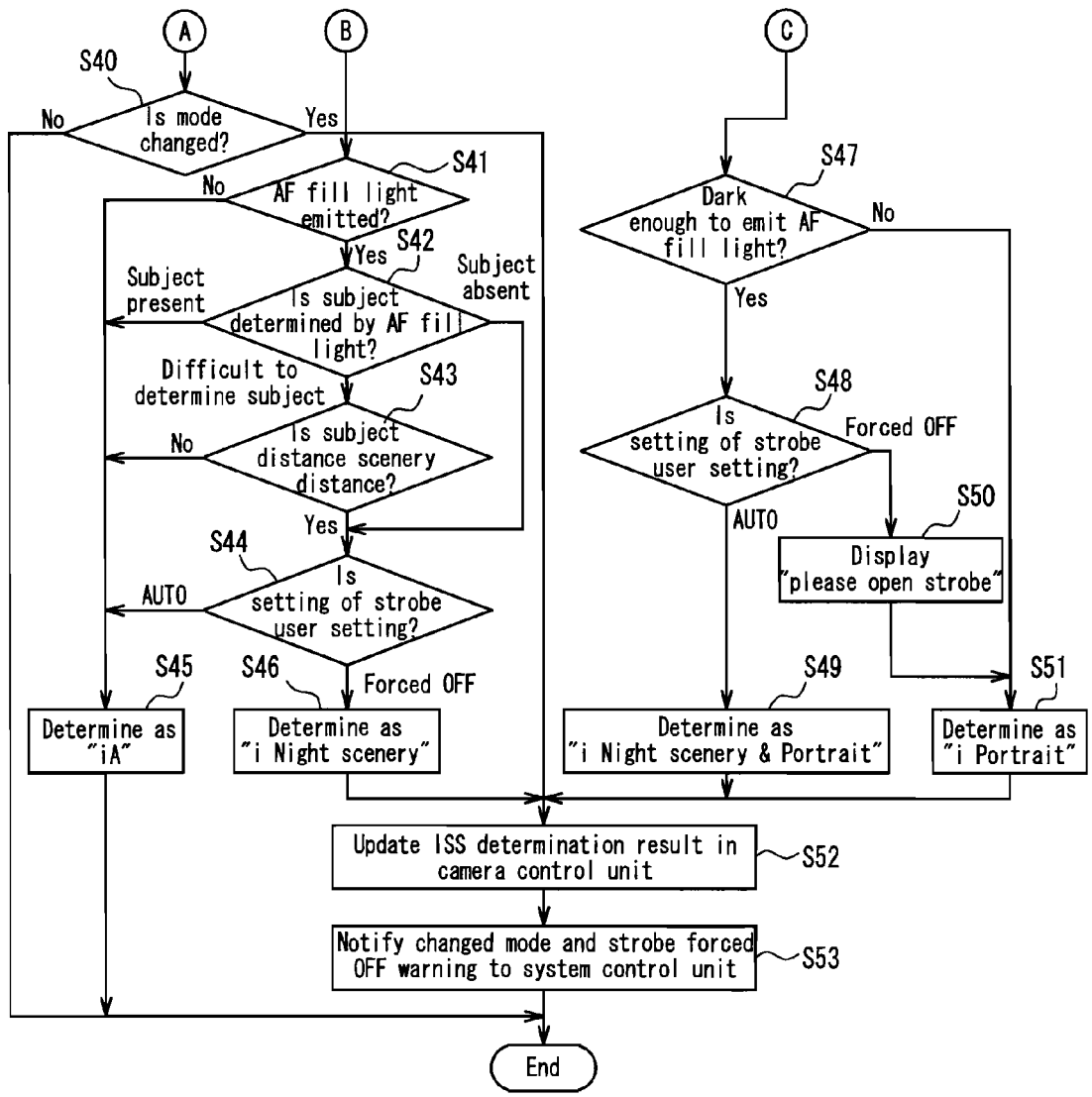
FIG. 15B is a flowchart for explaining the operation at the time of operating the release button.

FIGS. 15A and 15B are flowcharts each showing the flow when the release button 2 is operated in the automatic scene selection mode. Note that the flow in FIG. 15A is linked to the flow in FIG. 15B through the portions A, B and C.

First, when the release button 2 is pressed halfway at the time the imaging device 1 is in the monitor state (the state in which the flow shown in FIGS. 13A and 13B ended) (S28), the system control unit 40 reads image data from the signal processing portion 27. Next, the personal determination control portion 40a determines whether or not a person's face is present in the area specified by the user at step S2 in FIG. 13A in the image data read from the signal processing portion 27 (S29). When the personal determination control portion 40a determines that a person's face is present in the image, the system control unit 40 performs step S30. Further, when the personal determination control portion 40a determines that a person's face is absent in the image, the system control unit 40 performs step S33.

Next, when the personal determination control portion 40a determines that a person's face is present in the image, the system control unit 40 determines whether a person's face is present or not in the area of the image on which the tracking control is performed (the area surrounded by the frame 88 in FIG. 14A, etc.). When it is determined that a face is present in the area on which the tracking control is performed, the system control unit 40 sets the i portrait mode (S39). At this time, the system control unit 40 only performs the face recognition, and does not yet perform the image processing or make changes to a variety of settings conforming to the i portrait mode. On the other hand, when it is determined that a face is absent in the area on which the tracking control is performed, the system control unit 40 sets the iA mode (S31).

Further, when a person's face is not recognized at the personal determination control portion 40a (No at S29), the system control unit 40 then determines the subject distance on the basis of the positional relationship between the zoom lens 21 and the focus lens 23 (S33). At this time, the subject distance is determined as one of the following: the "macro distance" as the shortest distance; the "scenery distance" as the longest distance; the "normal distance" as an intermediate distance between the macro and scenery distances; and "unknown" where the subject distance is unmeasurable. When the subject distance is determined as the macro distance, the system control unit 40 sets the i macro mode (S36). At this time, the system control unit 40 only performs the macro recognition, and does not yet perform the image processing or make changes to a variety of settings conforming to the i macro mode.

Further, when the subject distance is determined as the scenery distance (Yes at S34), the system control unit 40 determines whether the shooting is taking place in outdoors or not on the basis of the illumination in the shooting environment (S35). Specifically, an EV value as brightness information is calculated, and on the basis of the size of the EV value, the illumination is determined as any one of the "low illumination", the "normal illumination" and the "outdoor illumination".

When the illumination is determined as the outdoor illumination (outdoor shooting) as at step S35, the system control unit 40 sets the i scenery mode (S38). At this time, the system control unit 40 only performs the scenery recognition, and does not yet perform the image processing or make changes to a variety of settings conforming to the i scenery mode.

Further, when the illumination is not determined to be the outdoor illumination as a result of step S35, the system control unit 40 sets the iA mode (S37).

The system control unit 40 performs the scene determination process that steps S32 to S39 indicate only once when the release button 2 is pressed halfway.

Since the operation to be performed thereafter is similar to that in Embodiment 2, the description thereof will not be repeated.

As described above, by a user pressing the area of the touch panel 53 corresponding to a given subject image in the image displayed on the display panel 52, AF operation and the tracking control are performed on the subject image selected by pressing the touch panel 53. The system control unit 40 determines that the subject image on which the tracking control is performed is any one of the i portrait mode, the scenery mode, the i night scenery mode, the i night scenery & portrait mode, the i macro mode and the iA mode on the basis of the conditions of the optical system such as the condition of the zoom lens 21. And on the basis of the determination result, the settings of the imaging system, etc. in the imaging device 1 are changed automatically. By having such a configuration, there is no need for a user to select the shooting mode suited for the shooting scene, and consequently the operability can be improved.

Further, since it is possible to select the subject image to be the target of AF operation and the tracking control by operating the touch panel 53, a user easily and promptly can select the subject image on which the user wants to perform AF operation and the tracking control no matter where the subject image is in the image. As a result, the operability can be improved.

3. Effects of the Embodiment, Etc.

According to the present embodiment, the imaging device includes the display portion 50 provided with the touch panel 53. By a user pressing the area of the touch panel 53 corresponding to a given area in an image displayed on the display panel 52, AF operation and the tracking control can be performed on the image in the pressed area. Further, the image in the pressed area (the image on which AF operation and the tracking control is performed) is automatically recognized to determine that the mode of the imaging device 1 is any one of the i portrait mode, the i scenery mode, the i macro mode and the iA mode. And on the basis of the determination result, the settings of the imaging system, etc. in the imaging device 1 are changed automatically. By having such a configuration, there is no need for a user to select the shooting mode suited for the shooting scene, and consequently the operability can be improved.

Further, since it is possible to select the subject image to be the target of AF operation and the tracking control by operating the touch panel 53, a user easily and promptly can select the subject image on which the user wants to perform AF operation and/or the tracking control no matter where the subject image is in the image. As a result, the operability can be improved.

In the present embodiment, the display portion 50 is provided with the touch panel 53 and a given subject image displayed on the display panel 52 can be selected by pressing the touch panel 53. However, the operation for selecting the given subject image is not limited to pressing the touch panel 53. For example, the subject image may be selected by displaying a cursor on the image displayed on the display panel 52, moving the cursor to the position corresponding to the given subject image with the use of the cursor keys 10, and operating the button 11. Further, a given subject image may be selected by placing the subject image substantially at the center of the displayed image.

Since the operation at the time of recording in the present embodiment is substantially the same as that described in the section [2-3. Operation at the time of recording] in Embodiment 1, the description thereof will not be repeated.

In Embodiments 1 to 3, the release button 2, the zoom switch 3, the mode dial 9, the operation portion 30 and the touch panel 53 are examples of the operation portion of the present invention.

INDUSTRIAL APPLICABILITY

The present invention is useful as an imaging device such as a digital camera.

The invention claimed is:

1. An imaging device comprising:
an image generator that generates an electric image of a subject;
an operation portion that receives an instruction for a shooting preparation operation or a shooting operation; and
a scene discriminator that discriminates a specific shooting scene from a plurality of shooting scenes on the basis of information on the image generated by the image generator and/or information on the subject,
wherein the scene discriminator discriminates the specific shooting scene to select a shooting mode when the operation portion is in a non-operated state, and after the operation portion receives an instruction for at least one of the shooting preparation operation or the shooting operation, the scene discriminator obtains the information on the image generated by the image generator and/or the information on the subject afresh to discriminate the specific shooting scene again to select the shooting mode.

2. The imaging device according to claim 1, wherein the scene discriminator switches between the plurality of shooting scenes to be discriminated when the operation portion is in the non-operated state and the plurality of shooting scenes to be discriminated afresh after the operation portion receives the instruction for at least one of the shooting preparation operation or the shooting operation.

3. The imaging device according to claim 1, wherein
the image generator includes:
an image pickup that converts an optical image of the subject entering thereinto to an electric image;
a zoom controller that drives and controls a zoom lens for scaling up or down the optical image; and
a focus controller that drives and controls a focus lens capable of bringing the optical image into focus on an imaging surface of the image pickup, and
the imaging device further comprises a strobe light emitter that outputs strobe light.

4. The imaging device according to claim 3, wherein
at least when the operation portion is in the non-operated state, the scene discriminator discriminates a scenery image on the basis of a distance to the subject on which the focus controller focuses and brightness information on the subject.

5. The imaging device according to claim 3, wherein
at least when the operation portion is in a non-operated state, the scene discriminator discriminates a macro image on the basis of information on whether or not a distance to the subject on which the focus controller focuses is smaller than a predetermined distance.

6. The imaging device according to claim 3, wherein
after the operation portion receives the instruction for the shooting preparation operation or the shooting operation, the scene discriminator discriminates a portrait including night scenery on the basis of at least information on whether or not a person is included in the image generated by the image generator, brightness information on the subject, and information on whether or not the strobe light emitter is enabled to flash.

7. The imaging device according to claim 6, wherein the strobe light emitter is enabled to pre flash before a main flash after the operation portion receives an instruction for the shooting operation, and
after discriminating the portrait including night scenery, the scene discriminator causes, when the operation portion receives the instruction for the shooting operation, the strobe light emitter to pre flash so as to calculate a brightness difference between a background of the image before the pre flash and the background of the image after the pre flash,
when the brightness difference is a predetermined value or more, the scene discriminator determines that the image is a portrait, and
when the brightness difference is less than the predetermined value, the scene discriminator determines that the image is a portrait including night scenery.

8. The imaging device according to claim 6, wherein
when the scene discriminator discriminates the portrait including night scenery and the strobe light emitter is enabled to flash at that time, the strobe light emitter is set to flash in a red-eye reduction/slow sync mode.

9. The imaging device according to claim 3, further comprising a vibration detector that detects vibrations of the imaging device,
wherein the scene discriminator determines whether or not the imaging device is fixed on the basis of a result of detection performed by the vibration detector.

10. The imaging device according to claim 3, wherein
the image generator further comprises
an auxiliary light emitter capable of outputting auxiliary light when the focus controller performs focus control.

11. The imaging device according to claim 10, wherein
the auxiliary light emitter is enabled to output auxiliary light after the operation portion receives the instruction for the shooting preparation operation or the shooting operation, and after the operation portion receives the instruction for the shooting preparation operation or the shooting operation, the scene discriminator discriminates a night scenery image on the basis of at least brightness information on the subject and an amount of auxiliary light that is outputted from the auxiliary light emitter and reflected by the subject.

12. The imaging device according to claim 11, wherein
when the scene discriminator discriminates the night scenery image and the strobe light emitter is enabled to flash at that time, the strobe light emitter is set to flash in a slow sync mode on the basis of information that a person is not included in the image generated by the image generator.

13. The imaging device according to claim 10, wherein
the auxiliary light emitter is enabled to output auxiliary light after the operation portion receives the instruction for the shooting preparation operation or the shooting operation, and after the operation portion receives the instruction for the shooting preparation operation or the shooting operation, the scene discriminator discriminates a night scenery image on the basis of at least brightness information on the subject, an amount of auxiliary light that is outputted from the auxiliary light emitter and reflected by the subject, and information on whether or not the strobe light emitter is enabled to flash.

14. The imaging device according to claim 1, wherein
at least when the operation portion is not in the non-operated state, the scene discriminator discriminates a portrait on the basis of information on whether or not a person is included in the image generated by the image generator.

15. The imaging device according to claim 1, further comprising a display portion capable of displaying the image generated by the image generator or an image obtained by subjecting the image to a predetermined process, wherein the display portion is capable of displaying information on a result of discrimination performed by the scene discriminator.

16. The imaging device according to claim 15, wherein
when the scene discriminator discriminates the specific shooting scene, the display portion temporarily changes a display form of the information on the discrimination result.

17. An imaging device comprising:
an image generator that generates an electric image of a subject;
an operation portion that receives an instruction for a shooting preparation operation or a shooting operation;
an area selector capable of selecting a given area in the image generated by the image generator; and
a scene discriminator that discriminates a specific shooting scene from a plurality of shooting scenes on the basis of information on an image in the area selected by the area selector and/or information on the subject,
wherein the scene discriminator discriminates the specific shooting scene to select a shooting mode when the operation portion is in a non-operated state, and after the operation portion receives an instruction for at least one of the shooting preparation operation or the shooting operation, the scene discriminator obtains information on the image in the area selected by the area selector and/or information on the subject afresh to discriminate the specific shooting scene again to select the shooting mode.

18. The imaging device according to claim 17, wherein
the area selector is composed of a touch panel capable of detecting a position of a portion on an operation surface where a contact object comes into contact.

19. The imaging device according to claim 17, wherein
the scene discriminator causes the area selected by the area selector to track a movement of the image, and discriminates the specific shooting scene on the basis of information based on information on the image included in the tracked area.

20. The imaging device according to claim 17, wherein the scene discriminator switches between the plurality of shooting scenes to be discriminated when the operation portion is in a non-operated state and the plurality of shooting scenes to be discriminated afresh after the operation portion receives the instruction for at least one of the shooting preparation operation or the shooting operation.

* * * * *

UNITED STATES PATENT AND TRADEMARK OFFICE
CERTIFICATE OF CORRECTION

PATENT NO. : 8,294,813 B2
APPLICATION NO. : 12/670073
DATED : October 23, 2012
INVENTOR(S) : Kawaguchi It is certified that error appears in the above-identified patent and that said Letters Patent is hereby corrected as shown below:

Column 40, line 38 (claim 19): before "on the image" delete "based on information".

Signed and Sealed this
Nineteenth Day of March, 2013

Teresa Stanek Rea
*Acting Director of the United States Patent and Trademark Office*